United States Patent [19]

Austin

[11] 4,281,379

[45] Jul. 28, 1981

[54] COMPUTER DRIVEN CONTROL SYSTEM FOR A NUMERICALLY CONTROLLED MACHINE TOOL

[75] Inventor: Len S. Austin, Madison County, Ill.

[73] Assignee: McDonnell Douglas Corporation, St. Louis, Mo.

[21] Appl. No.: 970,163

[22] Filed: Dec. 18, 1978

[51] Int. Cl.[3] ..................... G06F 15/16; G06F 15/46; G05B 19/417

[52] U.S. Cl. .................................. 364/102; 318/569; 364/120; 364/474; 364/200

[58] Field of Search ............... 364/474, 119, 107, 101, 364/102, 118, 120, 200 MS File, 900 MS File; 318/562, 569, 570

[56] References Cited

U.S. PATENT DOCUMENTS

| | | | |
|---|---|---|---|
| 3,699,317 | 10/1972 | Middleditch | 364/119 X |
| 4,074,350 | 2/1978 | Roch et al. | 364/474 X |
| 4,079,235 | 3/1978 | Froyd et al. | 364/474 X |
| 4,118,771 | 10/1978 | Pomella et al. | 364/474 X |
| 4,121,284 | 10/1978 | Hyatt | 364/200 |

OTHER PUBLICATIONS

Numeripath CNC 800 Control Systems, Giddings & Lewis Electronics Comp., Fond du Lac, Wisconsin, pp. 1-8.

Mesniaeff, The Technical Ins and Outs of Computerized Numerical Control, Control Engineering, Mar. 1971, pp. 65-84.

*Primary Examiner*—Joseph F. Ruggiero
*Attorney, Agent, or Firm*—Lionel L. Lucchesi

[57] ABSTRACT

A control system for a numerically controlled (NC) machine tool which includes a direct access, time sharing, general purpose host computer located remotely from the location of the machine tool, is provided with a dedicated microprocessor located proximate the machine tool. The dedicated microprocessor has a storage memory in which at least one control tape or program may be stored. The microprocessor is operatively connected to the general purpose computer through a telecommunication (telephone) data set. The dedicated microprocessor in turn is connected to the machine control unit (MCU) of the NC machine tool by a behind the tape reader interface. In operation, the general purpose computer is used on a time share basis to generate a suitable machine control program. The machine control program is transferred to the dedicated microprocessor by means of the telecommunication data set. Thereafter, the machine control program may be edited or revised on a real time basis at the machine tool. Once the machine control program is found acceptable, it is independent of the host computer and it may be shifted from one machine to another independently of machine tool location.

15 Claims, 20 Drawing Figures

TRANSMIT OR STORE PROGRAM FOR HOST COMPUTER.

MICRO PROCESSOR
COMMUNICATIONS PROGRAM.

DATA-LINK INPUT PROCESSING.

KEYBOARD INPUT PROCESSING FOR COMMUNICATIONS.

COMPUTER DRIVEN CONTROL SYSTEM FOR A NUMERICALLY CONTROLLED MACHINE TOOL

BACKGROUND OF THE INVENTION

This invention relates to numerical control (NC) systems, and more particularly to a computer-driven control system for a numerically controlled machine tool.

A typical NC machine tool includes a machine control unit (MCU) and an electric or hydraulic servo-mechanism and drive unit. The machine control unit (MCU) receives a program signal either from a punched paper tape which is fed into a tape reader on the MCU or from an intermediate computer in the case of a direct numerical control (DNC) system or a computer numerical control (CNC) system. The MCU sends a command signal to the machine tool servo-mechanism, and the machine table or cutting tool is moved in response to the command signals from the MCU. Movement of the machine table or cutting tool is monitored by a feedback unit which generates a feedback signal for checking machine operation.

In many NC machining operations, especially those which are relatively simple or only moderately complex, numerical control programs are generated by hand on paper tapes. Hand or off line programming refers to the act of creating a control tape (or control program) by computing all necessary numbers and then using a Flexowriter or an equivalent device to make the punched paper tape of the program. Most smaller NC machine shops utilize hand programming. However, for profiling and other more complex NC machining operations, control tapes are generated with the aid of a computer.

Once an initial control tape has been generated, it must be used to operate the machine to ensure that the part made by the NC machine tool is, in fact, the desired part. This testing procedure is usually referred to as a tape-try out (TTO) cycle. The paper tape is loaded in a tape reader for the machine which interfaces with the MCU. The MCU drives the machine tool so as to produce the part. The part is then checked, and needed corrections are made to the control tape. A new paper tape is then made, tried, and checked. In many instances, 5-10 correction cycles are needed before a hand programmed control tape is proven.

Each tape tryout involves feeding it into the tape reader, and operating the machine tool via the MCU. Of course, to tryout a tape, the machine tool first must be setup for the new tape being tried out. Since correcting the tape may take several hours or even overnight, the machine tool oftentimes must be set up for another job utilizing a proven control tape or must be kept idle while the new tape is being corrected. Since each correction cycle usually requires two machine setups, it is highly desirable to reduce the number of tape tryout cycles needed to prove a new tape. This problem becomes even more acute in short production runs with frequent tooling changes.

Many NC users make use of a computer in generating NC programs. This is done as a batch processing operation and it typically involves a computer terminal connected via telephone lines to a host or central computer having an NC processor. In addition to speeding programming, the computer is also used to check the program. The computer can discover many of the programming and logic errors associated with hand programming, but it cannot discover many dimensional errors which may be present.

Tapes are also checked by computer plotting so as to verify the path of the machine tool cutter before the tape is run through the machine tool. This graphical checkout technique can uncover many errors before the machine tool is taken out of production for an actual tape tryout cycle. While these techniques significantly reduce the number of tape tryouts required to prove a tape, typically one to three tape tryouts still are required. In any event, use of larger computers for the checkout process is expensive.

Paper tape readers themselves have presented significant operational problems. Since the control paper tapes must be physically handled on the shop floor, tapes are often damaged by grease, oil, or other dirt and the tape readers must operate under severe operating environments. Thus, tape readers typically require a substantial amount of maintenance and are a continuing source of system malfunctions.

Direct numerical control (DNC) is an advanced system which bypasses the tape reader. The program data is fed directly into the MCU's in a so-called "behind the tape reader" (BTR) mode. In a DNC system, the control data normally on the paper control tape is stored electrically on disks, for example, in an intermediate program storage memory and is managed by an intermediate computer (usually a minicomputer). A typical prior art DNC system is illustrated in FIG. 1. The intermediate computer transfers data from the intermediate memory to the MCU's and also serves as a remote job processing terminal to a host computer for computer-assisted programming.

More specifically, now referring to FIG. 1, a typical prior art DNC machine tool control system is shown to include an intermediate computer (usually a dedicated minicomputer) which in turn is connected to a host computer which is preferably a large, general purpose digital computer, such as a model 360/168 commercially available from IBM, and which uses a part program language, such as APT (automatic program tools). The intermediate computer is linked to an intermediate program storage memory. A peripherial card reader and a stand-alone line printer are also connected to the intermediate computer. Further, the intermediate computer is connected to a multiplicity of machine control units (MCU). In FIG. 1, the intermediate computer is shown to be connected to eleven MCU's. It will, however, be understood that in many operational DNC systems that many more MCU's are intended to be controlled by the intermediate computer. For example, some commercially available DNC systems are capable of operating or controlling up to 256 MCU's and their respective machine tools. In addition, many DNC systems typically include a communication console (not shown) located on the shop floor adjacent the machine tool so as to permit communication between the shop floor and the host computer. In DNC systems, this conversational programming approach not only permits interaction between the machine operator and the host computer thereby to facilitate NC programming, but also provides a management information system linking all aspects of a manufacturing operation. However, DNC controlled systems are quite expensive and are thus prohibitive for smaller manufacturing companies or for larger companies with only relatively few NC machine tools.

DNC systems have been commercially available for a number of years from various machine tool manufacturers. One such system is described in U.S. Pat. No. 3,668,653, to Donald G. Fair et al, issued June 6, 1972.

Another system has also been developed under the nomenclature "computer numerical control" (CNC). A CNC system is an NC system in which a dedicated stored program computer is used to perform some or all of the NC functions in accordance with control programs stored in the read/write memory of the computer. Even though both DNC and CNC systems utilize computers, the computer supporting a DNC system is used to disseminate manufacturing data to, and to collect data from, many MCU's (see FIG. 1). However, a CNC computer usually supports only one machine tool. Also, the intermediate computer in a DNC system is usually located remotely from the machine tool, while the computer in a CNC system is located on the shop floor.

As noted above, the memory of the CNC dedicated computer (usually a minicomputer) has a read/write memory. This enables the programmer to alter, delete, insert, or otherwise modify the programs in the computer's memory. Also, a library of part programs can be stored in the CNC computer's memory.

In programming a CNC system, the program is typically implemented on a remote general purpose digital computer which is not a part of the CNC system. The program is then punched onto paper tape and this tape is used as an input into the CNC computer at the machine site. It is this paper tape that is modified or corrected during the tape tryout cycles. However, once the tape has been proved, the source deck of the off-line general purpose digital computer is not simultaneously updated. Thus, in a separate operation, the source deck must be updated or the next time the source deck is utilized to generate the program, errors will be present in the program so generated.

A need has long existed for an NC machine tool control system which permits DNC programming and checkout for even single machines and which is of comparatively low cost. The system of this invention accomplishes the purposes of DNC programming for single NC machines while the problems inherent in CNC control systems (e.g., their inability to converse with the remote general purpose computer) have been eliminated.

Reference may also be made to such prior art patents as 3,069,608 and 3,645,298 for further background information in regard to the present invention.

Among the several objects and features of this invention will be noted the provision of a system for the control of a single NC machine in which part programs (i.e., data representation of control tapes) may be stored in memory; The provision of such a system in which the program in a time sharing computer linked to the control system of the present invention can be automatically updated with changes made to the part program made on the shop floor;

The provision of such a system in which only one machine tool would be down in the event of a computer failure;

The provision of such a system in which software incorporated within the time sharing computer is automatically incorporated in the controllers at the site of each NC machine tool;

The provision of such a system which permits real time programming (as opposed to batch processing) when connected to a time sharing host computer thereby to permit corrections to the NC control program to be made at the machine tool site in real time (e.g., within a few minutes) so that the corrected tape may be immediately tried out without having to change the tooling setup of the machine tool;

The provision of such a system which permits data to be moved from one machine tool control system of this invention to another without reprocessing in a host computer thus allowing the machine tools in a manufacturing facility to be more efficiently utilized, and enabling the facility to be readily set up for new manufacturing operations at minimal cost;

The provision of such a system which eliminates problems relating to the reading and handling of punched paper tape and which eliminates tape reader problems;

The provision of such a system which, like DNC systems, substantially reduces the number of tape tryout cycles required to prove a control tape (as compared with prior hand NC programming operations) and, unlike DNC system, is suitable and economical for use with even a single NC machine tool;

The provision of such a system in which the part program may be edited or modified from the shop floor, and in which a revised program can be tried in a matter of minutes thus resulting in program data which can be proved in a matter of hours rather than days with a corresponding savings in time and with a corresponding increase in productivity of the machine tool controlled thereby;

The provision of such a system in which a critical part may be fabricated quickly and in which engineering changes to the part may be readily incorporated in the part program; and The provision of such a system and method which significantly increases the productivity of the machine tool it controls, which is reliable in operation, which can be adapted for use with prior NC machines, and which is of reasonable cost.

Other objects and features of this invention will be in part apparent and in part pointed out hereinafter.

SUMMARY OF THE INVENTION

In accordance with this invention, generally stated, a control system of this invention is adapted for use with an NC machine tool, the latter including a machine tool control unit (MCU) for controlling operation of the machine tool. The control system of this invention comprises a dedicated computer (microprocessor) located proximate the machine tool (preferably on the shop floor). This dedicated computer is connected to the machine control unit and is linked to a time sharing, direct access, general purpose computer located remotely from the site of the machine tool by suitable communication means. A storage memory is provided which either may be a part of the dedicated computer or may be a separate storage memory. The control system of this invention has an input/output device connected to the dedicated computer and located proximate to the machine tool location. The dedicated computer is also interfaced with the machine control unit so as to input directly to the machine control unit without the use of a punched paper tape or the like whereby the dedicated computer functions as a control data buffer for the machine control unit and thus permits modification of a control program stored in the storage memory from a location proximate to the machine tool and selectively permits updating of the time sharing computer.

Briefly, the method of this invention utilizes a computer for controlling an NC machine tool, the latter having a machine control unit. The method comprises the steps of generating control data or program in a remotely located, time sharing general purpose digital computer. This control data is then transmitted to a dedicated computer (preferably a microprocessor) at the location of the machine tool via a telecommunication link. The control data is stored in a storage memory and the machine control unit is programmed with the control data from the microprocessor via a behind the tape reader (BTR) interface between the machine control unit and the microprocessor. Still further, the control data may be selectively modified or corrected from an input/output terminal located proximate to the machine tool.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
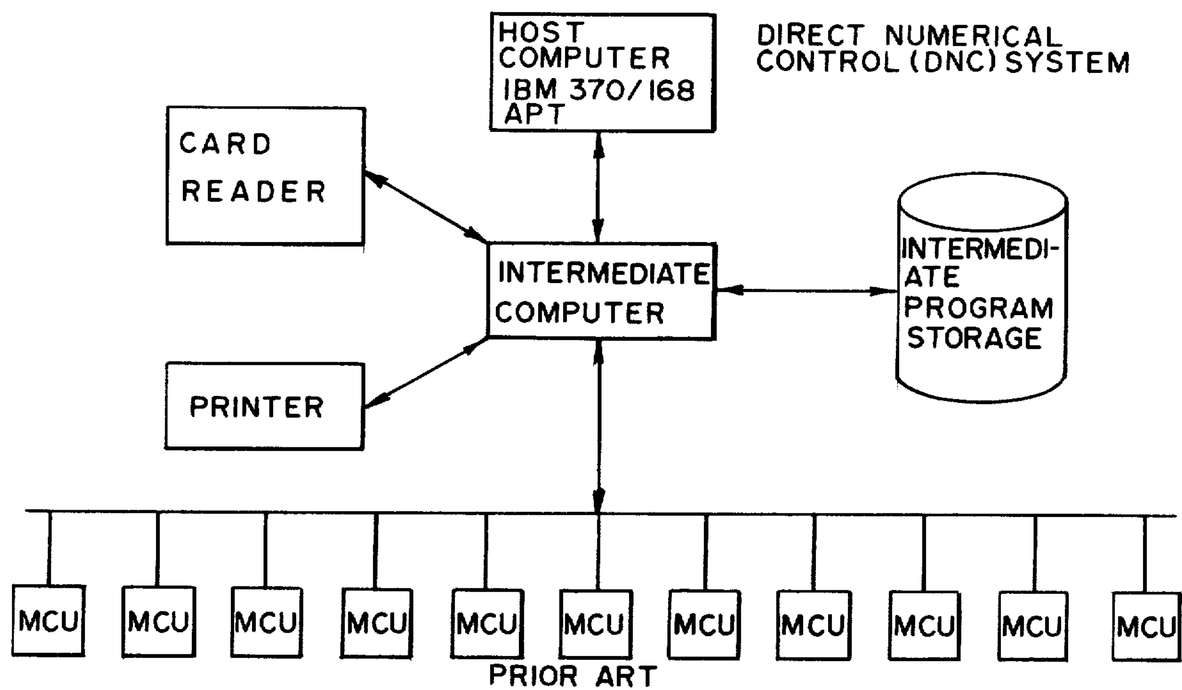
FIG. 1 is a block diagram of a prior art direct numerical control (DNC) machine control system.
Figure 2:
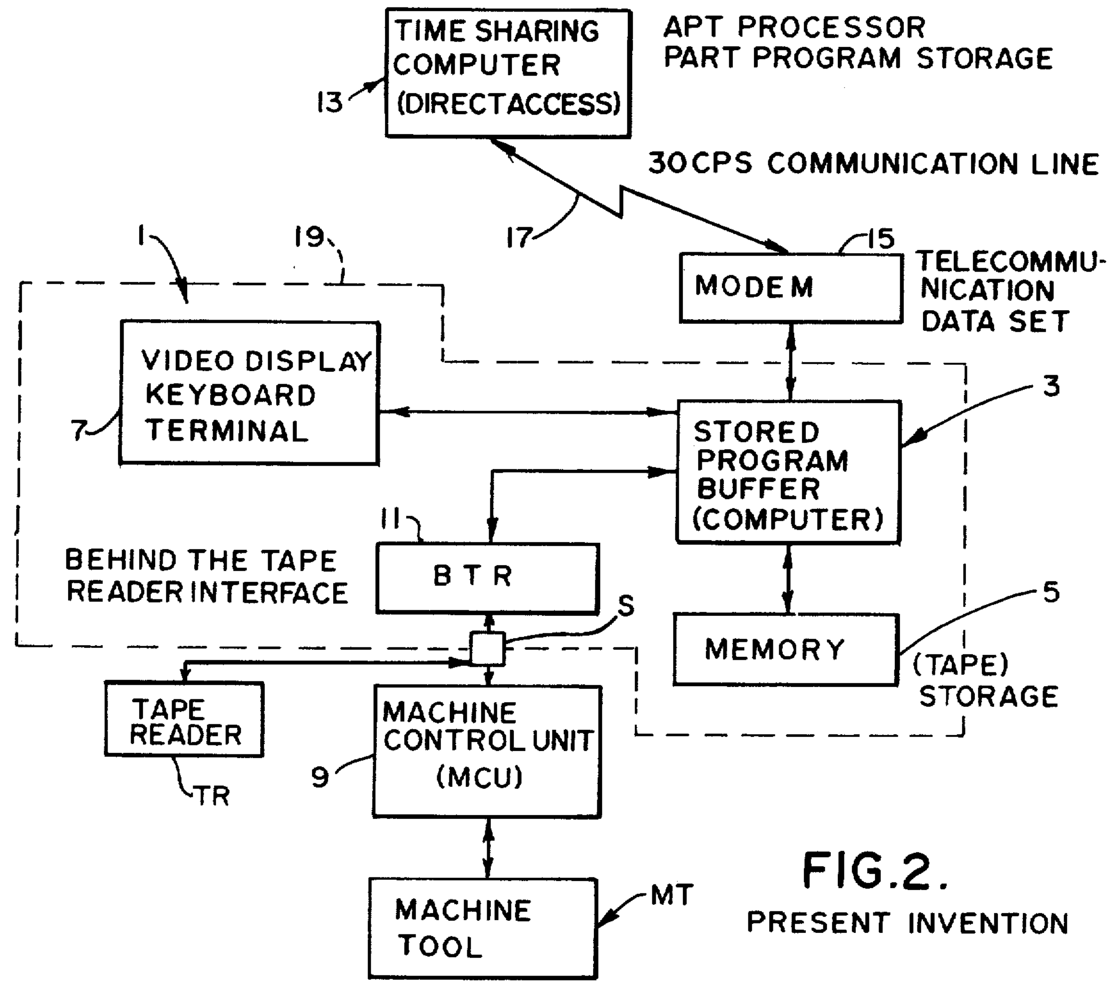
FIG. 2 is a block diagram of a computer driven machine tool control system of the present invention.

Referring now the drawings, a computer driven control system of this invention for a numerically controlled (NC) machine tool (MT) is indicated in its entirety by reference character 1 in FIG. 2 and is generally shown inside the dashed line box. This computer driven control system includes a dedicated computer 3, preferably a microprocessor, which is used to perform various programming and control functions. The control system includes a storage memory 5 (which may either be a part of the microprocessor or a separate storage memory) of sufficient size so as to store at least one (and preferably a plurality) of control programs (also referred to as control data) for programming the NC machine tool MT so as to produce a specified part or to perform specified machining operations. A video display/keyboard terminal 7 is located on the shop floor adjacent or proximate to the location of the machine tool for ready operation by the tool operator. This terminal 7 is linked to microprocessor 3 which is also located near the site of the machine tool on the shop floor. The input/output terminal is used to control the operation of microprocessor 3. Of course, it will be understood that within the broader aspects of this invention other input/output terminals may be utilized in place of the video display/keyboard terminal 7 outlined above.

Microprocessor 3 (also referred to as a machine tool computer) is linked to a respective machine control unit (MCU) 9 by means of a behind the tape reader (BTR) interface, as indicated at 11. A two position switchs is provided on the interface. When the switch is in its first or buffer position, the NC machine can be run from the data accessed by the microprocessor. When the switch is in its second or tape position, it allows the NC machine to be run from paper tape read by a tape reader "TR" with the microprocessor disconnected. This eliminates the necessity of (but not the capability of) programming the MCU by means of a punched paper control tape. In the buffer mode, the MCU is controlled directly by the microprocessor. This arrangement overcomes most of the problems heretofore associated with use of a punched paper tape to program the MCU and eliminates malfunctions caused by torn or soiled paper tapes or caused by an electromechanical malfunction of the tape reader unit.

Microprocessor 3 is linked to a remotely located, direct access, time sharing general purpose digital host computer, as generally indicated at 13, by means of a modulator-demodulator (modem) 15 and by, for example, a thirty character per second telecommunication link (i.e., a telephone line) 17. It will be understood, however, that within the broader aspects of this invention any suitable telecommunication data set may be used, so long as it is compatible with the various components of system 1. This dial-up telecommunication data set provides ready access between the computer driven control system 1 of this invention and time sharing host computer 13. The latter has a suitable numerical control software package (e.g., APT or its equivalent language programming) and an NC processor thereby enabling the user to generate and to edit control data. The software for such a host computer is commercially available and for that reason is not herein described in detail. For example, one such time sharing host computer system is commercially available under the tradename DAC II from the McDonnel Douglas Automation Company of St. Louis, Missouri. This commerically available time sharing computer actually consists of two computers (models 175 and 173) manufactured by Control Data of Minneapolis, Minnesota. These two computers have shared-file capability so that if one computer goes down, the other can be accessed.

Host computer 13 includes data storage means (not shown) which may be a suitable memory storage, a magnetic disk file, or the like. Of couse, the data stored in this storage means is accessible by computer 13. This data has already been processed by host computer 13 to contain instructions directly readable by MCU 9. Thus, MCU readable instructions are transmitted to microprocessor 3 by the host computer. Alternatively, microprocessor 3 can be programmed to translate programs from host computer 13 into signals readable by MCU 9.

Thus, through the use of computer driven control system 1 of this invention and host time sharing computer 13, a part programmer at the machine tool location has access to the host computer from the shop floor so as to permit him to perform on-line editing and compilation of his part program (or control data) efficiently and further permits on-line loading of machine control data that is an output of the APT compiler in the host computer. The latter also has a secured disk file storage system (not shown) associated therewith in which a large number (a library) of control data may be stored.

As mentioned above, dedicated computer 3 is preferably a microprocessor which may be any one of a number of commercially available microprocessors. For example, a model 8080 microprocessor commercially available from INTEL Corporation of Santa Clara, California may be used. The microprocessor is installed in a suitable console 19 (as shown by the dashed lines in FIG. 2) and is provided with a suitable power supply (not shown) and operator's panel (also not shown). The power supply is conventional and consequently is not described in detail. Memory 5 is preferably of sufficient size as to store the information typically contained on about 180 feet (54.8 m.) of punched paper tape. However, larger memory storage capability may be utilized, if desired, thereby allowing a large number of control programs to be stored in memory for ready access. With this memory storage capability, the computer control system 1 of this invention is intended to be operated independently of time sharing computer 13. Console 19 also contains behind the tape reader interface 11.

Video display/input terminal 7 is also shown as a part of console 19, but it will be understood that this terminal may be a stand-alone terminal. This terminal may be any one of a number of well-known commercially available peripherial terminals, such as a model ADM-3A made by the Lear-Siegler Corporation of Anaheim, California. The terminal has an alpha-numeric keyboard with associated switches thereon as will be hereinafter discussed.

The above-mentioned console 19 has an operator's panel 20 (see FIG. 6) which is in addition to input/output terminal 7. Both operator's panel 21 and terminal 7 include an alpha-numeric keyboard as well as specialized operational switches. This keyboard may constitute a backup for input/output terminal 7.

Figure 6:
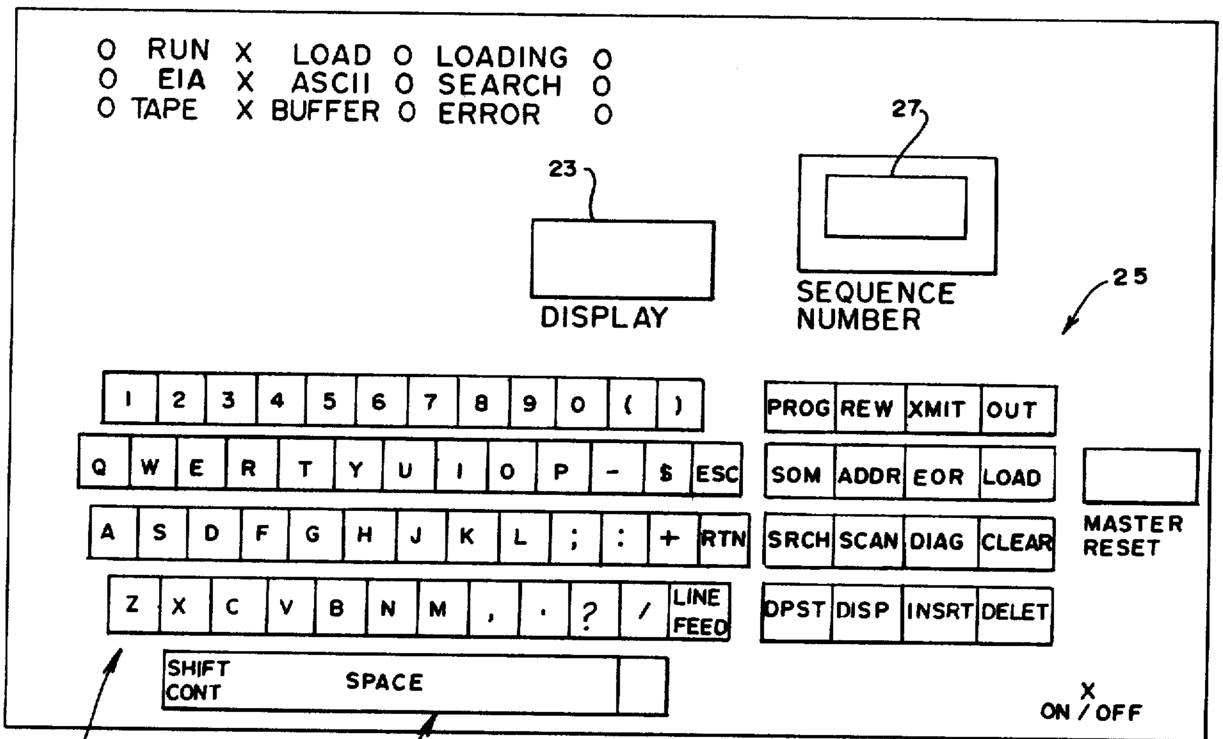
FIG. 6 is a view of the keyboard of a video display terminal or of an operator's panel included in the system of this invention.

Referring now to FIG. 6, operator's panel 20 is shown to include an alpha/numeric keyboard 21, a display 23, a plurality of command or option switches 25, and a sequence number selector 27. In addition, the following other switches are provided:

ON/OFF—Keyed power switch for equipment in console 19, it does not control power to terminal 7.

RUN/LOAD switch—Placing this switch in the RUN position allows data to be sent to the machine control unit. When the switch is in the LOAD position, no data can be sent to the machine control unit.

EIA/ASCII switch—This switch is set to the position which indicates the type of code used by the machine control unit.

TAPE/BUFFER switch—Placing this switch in the TAPE position allows the N/C machine to be run from paper tape and disconnects the machine control unit from the control system 1 of this invention. When the switch is in the BUFFER position, the N/C machine can be run from data in memory 5.

MASTER RESET button—Used to intialize the system on startup and to reset the system in case of difficulties.

SEQUENCE NUMBER thumbwheel switches—Hexadecimal coded switches used to set display scan rate and in conjunction with auxiliary keyboard.

DISPLAY—Four digit hexadecimal display used when terminal 7 is not available.

KEYBOARD—The typewriter style keyboard and auxiliary keyboard can be used if terminal 7 is not available.

As noted above, numerous command or option switches are provided on control panel 20 of control system 1. The operator may access these command functions or cause microprocessor 3 to execute them by inputting characters on input/output terminal 7 or on panel 20. The selected characters are as follows with alternative key entries indicated in parenthesis:

A. (ADDR) Address Search, the entry of this command set is a memory pointer which points to the current memory address of a specific memory address. It is executed by depressing the character A followed by a four digit memory address and entering return. The selected address is displayed on the video display (CRT) of terminal 7 and a memory pointer contains the displayed address.

EXAMPLE:

Enter: A123D ret
Display: 123D

B. (SOM) Buffer Rewind, this instruction is entered in the same manner as the previous instruction and sets the memory pointer to the start of memory, namely location 0000.

EXAMPLE

Enter: B
Display: 0000

C. CTRL-C (CLEAR) clear memory, this command sets the contents of all memory locations to 0000. It is entered by depressing a control key and the capital letter C. The memory is cleared and 0000 is displayed on the CRT.

EXAMPLE:

Enter: CTRL C
Display: 0000

D. (DPST) deposit value in memory, this command is used to replace the contents of the current memory location. It is entered by depressing the capital letter D, followed by the characters to be deposited. As each character is deposited, the current memory address is incremented by one. An additional character is deposited each time a key is depressed until an escape key (ESC) is entered.

EXAMPLE:

Enter: DHELLO ESC
Display: HELLO

| Current memory address | Before entry 12A0 | After entry 12A5 |
|---|---|---|
| Memory contents location | | |
| 12A0 | 30 | 48 (H) |
| 12A1 | 41 | 45 (E) |
| 12A2 | 00 | 4C (L) |
| 12A3 | 00 | 4C (L) |
| 12A4 | 00 | 4F (O) |

CTRL-D (DIAG) memory diagnostic, this command check all memory locations using a pattern which is entered in the right two digits of sequence number thumbwheel switches associated with input/output terminal 7. This is accomplished by setting the right two digits of the thumbwheel switches to the desired test pattern, and depressing both the control key CTRL and the capital letter D. The address of the first bad memory location will be displayed or, if there are no memory errors, the highest memory address plus one will be displayed. This is followed by 0000 and the entire memory is cleared.

EXAMPLE: No memory errors

Enter: CTRL D
Display: 60000000

EXAMPLE: Error at memory location 01A8

Enter: CTRL D
Display: 01A80000

I. (INSRT) insert characters in memory, this command is used to insert a character at the current memory address. No characters are deleted, the remaining characters in the program are shifted to make space for the inserted character. Depress capital letter I, followed by the characters to be inserted. Depress (ESC) escape key to determine the insertions.

EXAMPLE:

Enter: I X-220
Display: X-220
Character string before insertion: N0060Y-13750
Character memory address at arrow.
Character string after insertion: N0060X-220Y-13750
Current memory address at arrow.

K. (DELET) delete a character, this command is used to delete a character at the current memory address. The remainder of the part program is shifted to fill the gap left by the delected character. It is utilized by depressing K for each character to be deleted.

EXAMPLE:

Enter: KKK
Display: None
Character string before deletion: N0060Y-13750
Current memory address at arrow.
Character string after deletion: N0060Y:10
Current memory address at arrow.

M. Enter time sharing mode, the letter M is entered as other entries heretofore described. Thereafter all subsequent entries on the keyboard will be passed on to the upstream host computer 13 until control key and the capital letter Z (CTRL Z) is entered to return to the local mode.

O. (OUT) output, this control key is used to start transmission of data to NC machine MT. Data starting at the current memory address is sent to numerical control machine as if the data were on paper tape. Data transmission continues until the end of file is reached, at which time the ponter is moved back to the start of the program, that is, the file is automatically rewound.

P. (PROG) program number search, this command is used to set the current memory address to the start of a particular program. It is utilized by depressing the capital letter P, followed by a digit from 0 to 9. The current memory address will point to the start of the program previously designated as program "i", where "i" represents one of ten programs positioned from 0 to 9. Searches and rewinds are restricted to selected programs.

EXAMPLE:

Enter: P3
Display: 1A78

| Contents of memory: | Location | Contents |
|---|---|---|
| | 1A76 | 50 (P) |
| | 1A77 | 33 (3) |

R. (REW) rewind, the current memory address is set to the start of the most recently selected program by this command.

EXAMPLE:

Enter: R
Display XXXX where XXXX is start of the selected program.

S. (SERCH) search for string, this command is used to set the current memory address to the start of a designated string. This can be used to locate a particular block of numerical control data prior to starting output of NC machine NT or to find a particular character string for editing purposes. The search takes place only in the current program. It is utilized by depressing the capital letter S, followed by the desired character string and a return.

EXAMPLE:

Enter: SN005 ret
Display: None

If the entire character string is found, the current memory address points the location containing the first character in the string. If the string was not found, the current memory address is unchanged and the display displays the word none.

T. CTRL-T transmit, indicates an actual transmission of data from the microprocessor to host computer 13. This command is also used to store in part programs on the higher level computer host computer 13 when processing is complete.

W. (SCAN) Scan memory, this command displays the contents of memory starting at the current memory address and continuing until the escape key (ESC) is depressed. The rate at which the characters are displayed is determined by setting of the thumwheel switch on the input/output terminal 7.

X. (DISP) display memory, each time X is depressed, the character at the current memory address is displayed and the current memory address is incremented by one which allows the programmer to step through the program one by one, while inspecting the same.

CTL-Z, local mode, when control Z is depressed while in the time share mode, the keyboard returns to the local mode and all commands as described above are acted. Otherwise controls remain in host computer 13 and communication is controlled thereby.

Figure 3A:
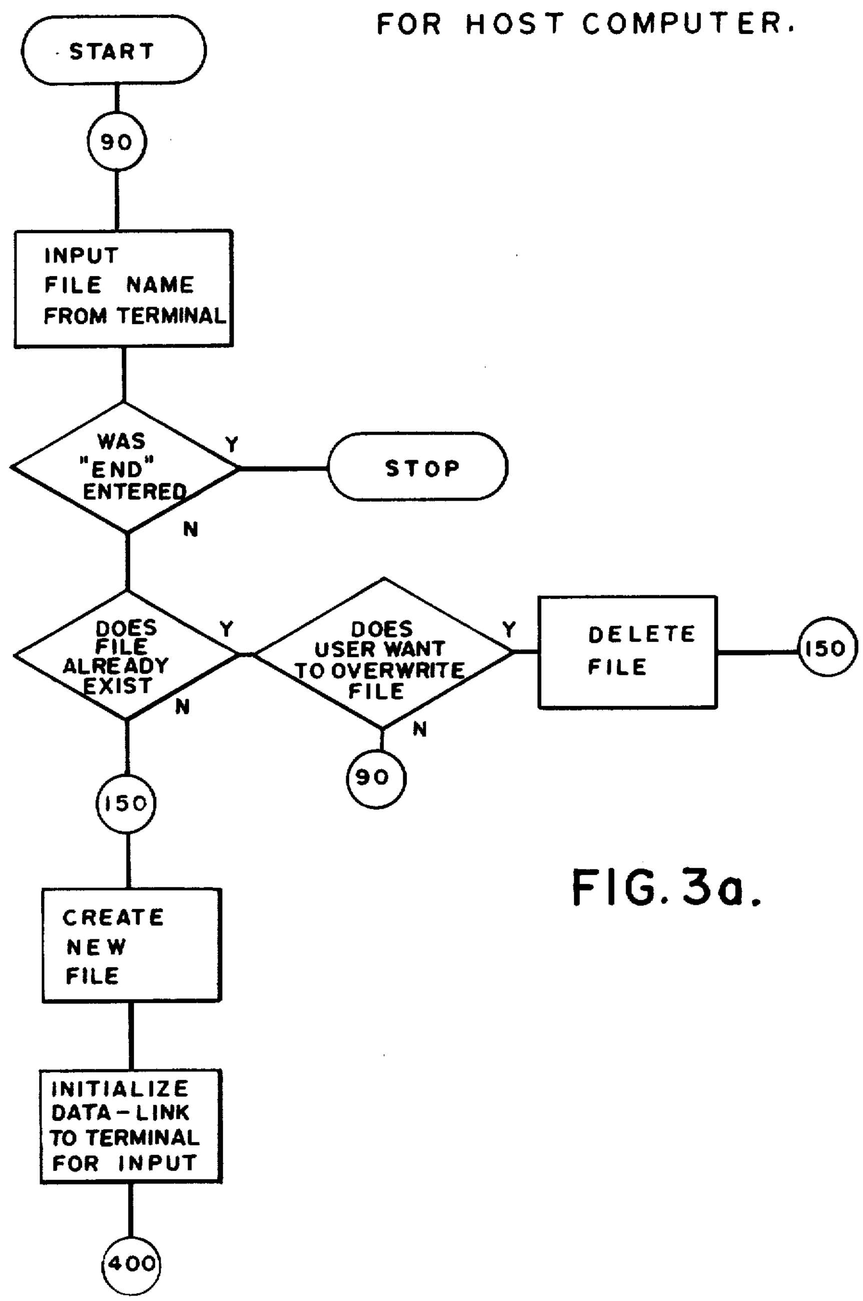
FIGS. 3*a*-3*c* show a block flow diagram of the host computer program for receiving a program corresponding to the program list shown in Appendix Table I.
Figure 3B:
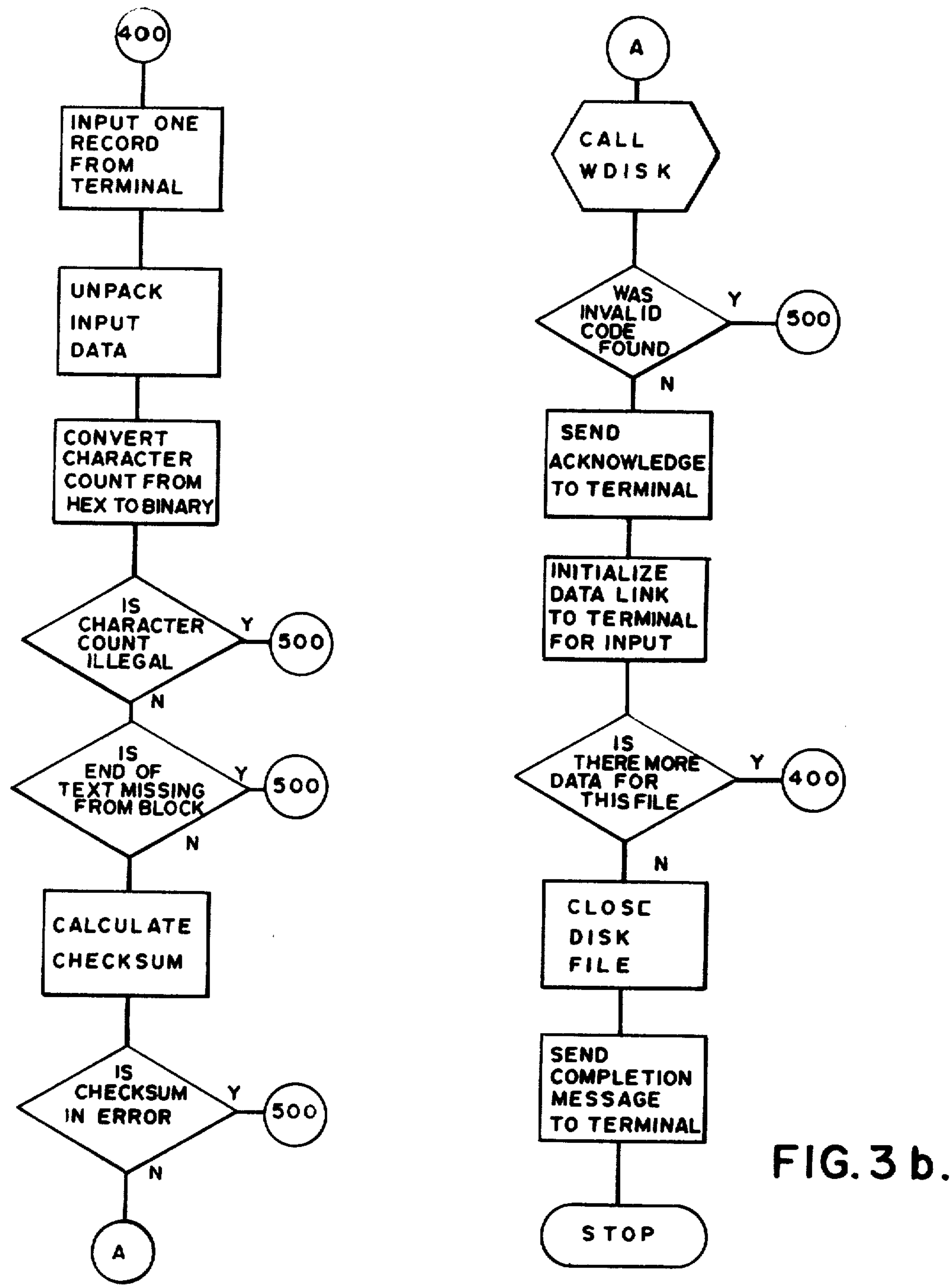
Figure 3C:
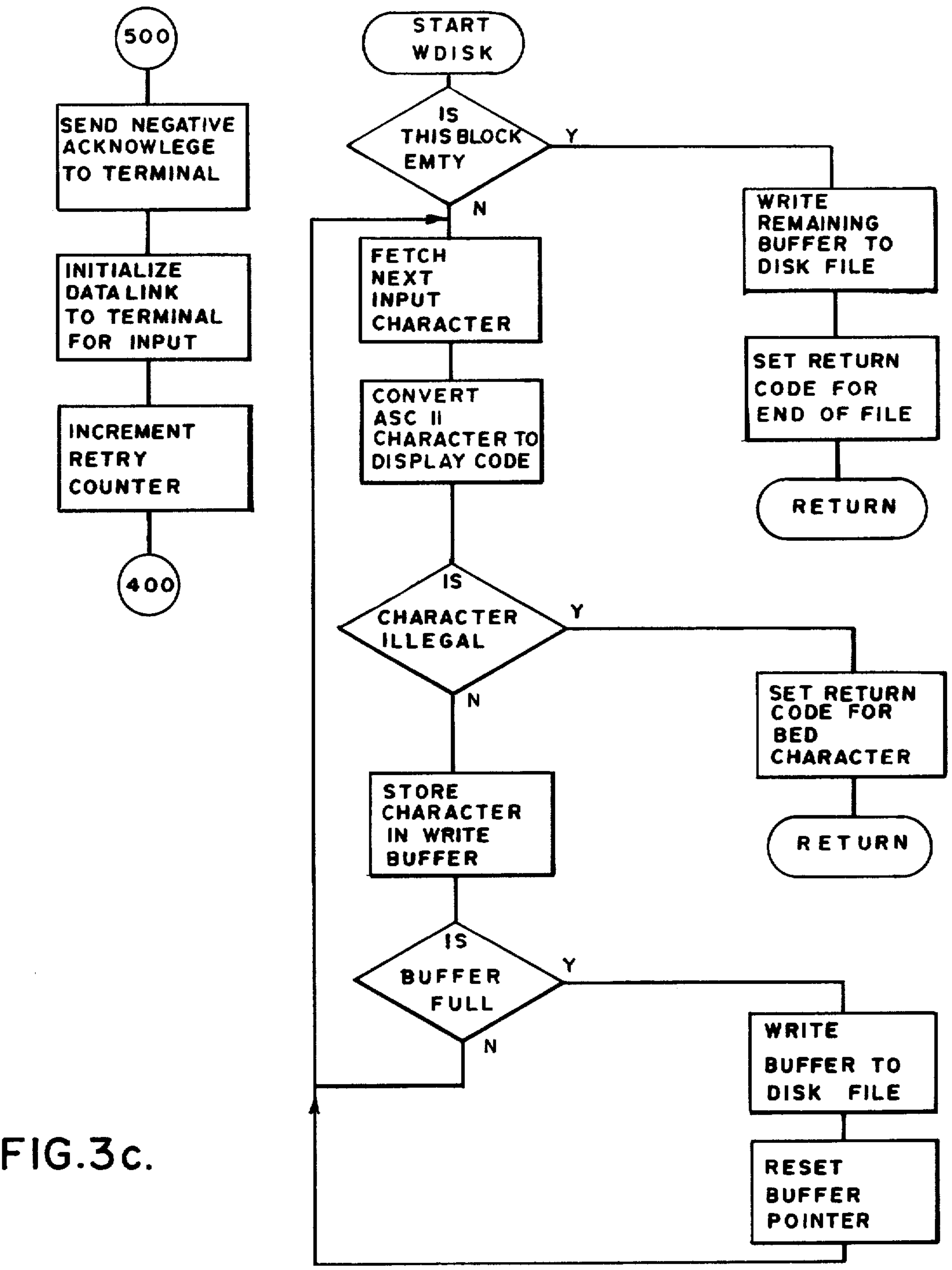
Figure 4A:
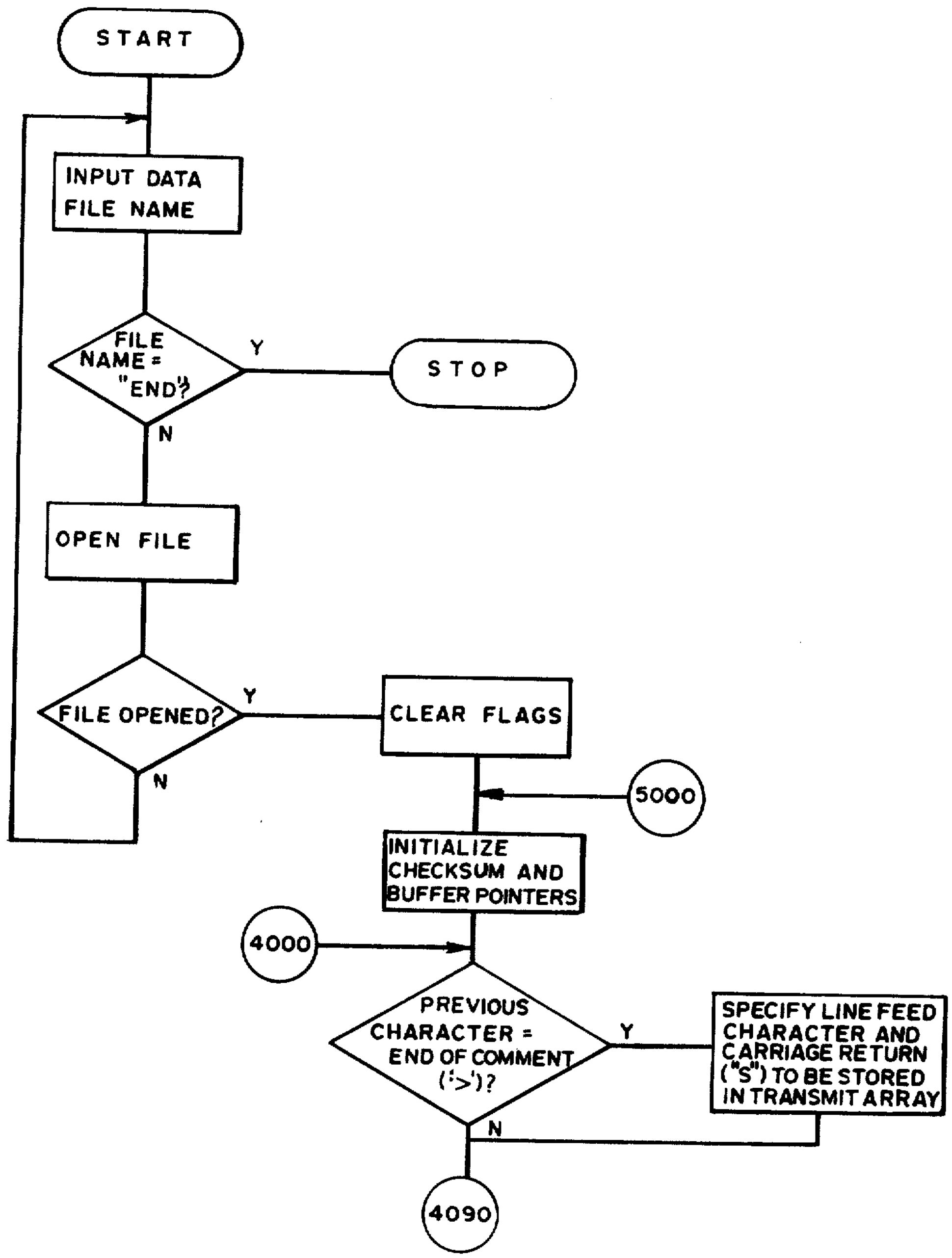
FIGS. 4*a*-4*e* show a block flow diagram of the host computer program for transmitting a program corresponding to the program list shown in Appendix Table II.
Figure 4B:
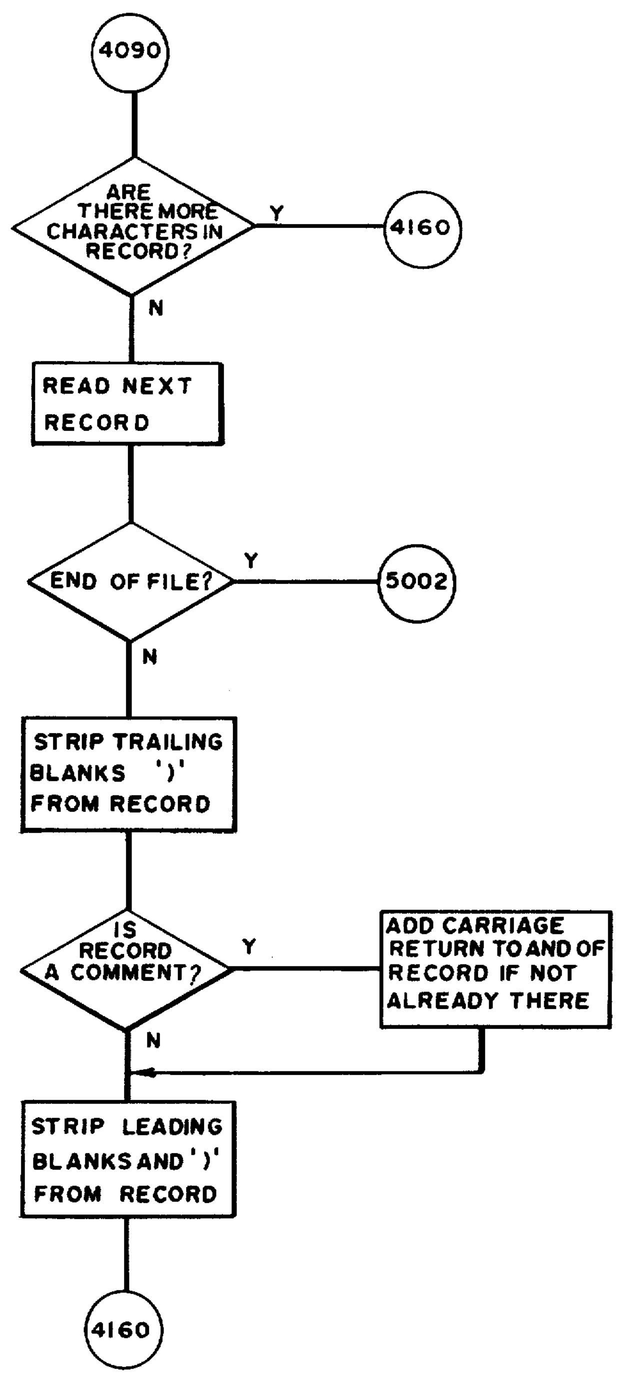
Figure 4C:
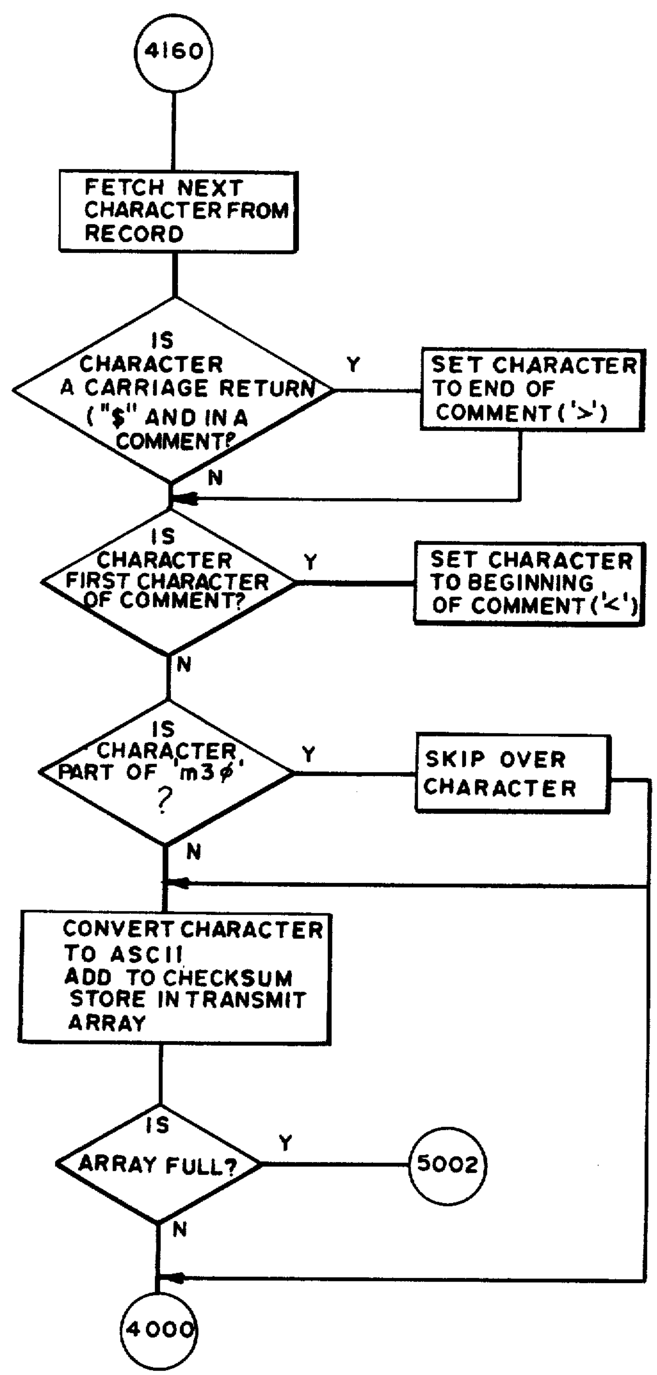
Figure 4D:
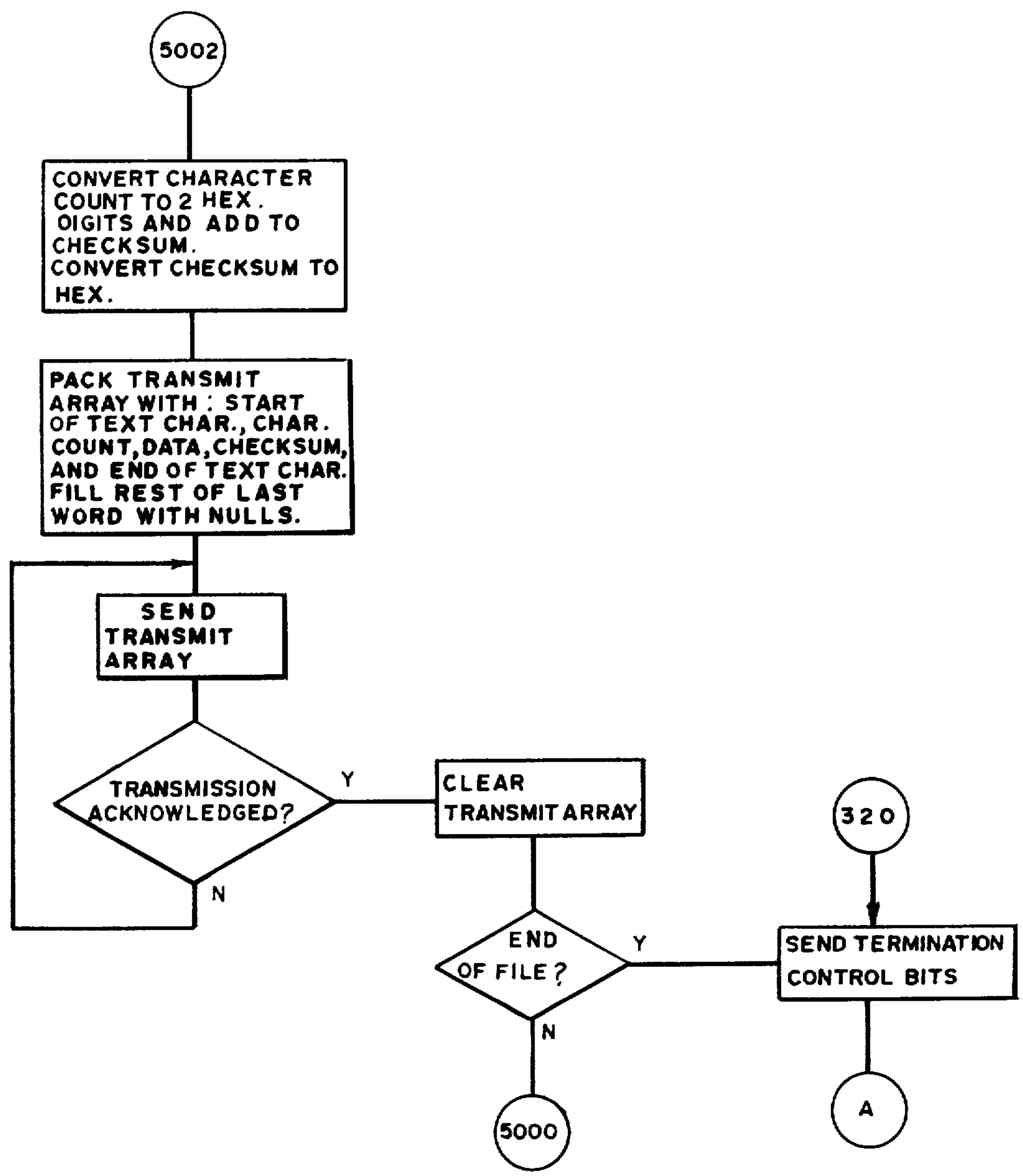
Figure 4:
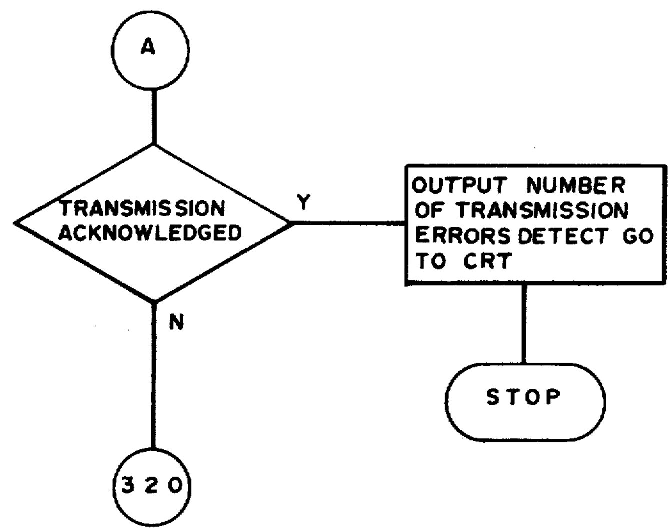
Figure 5A:
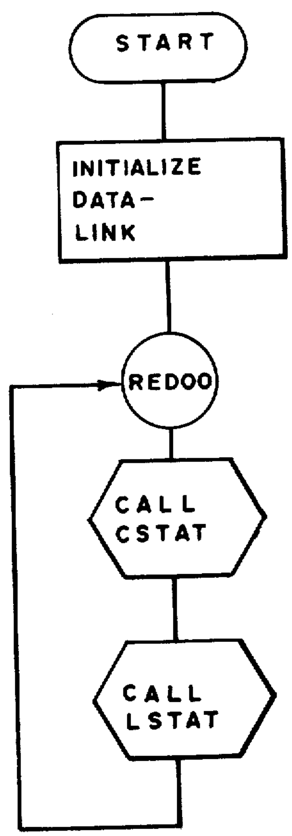
FIGS. 5*a*-5*g* show a block flow diagram of the microprocessor communications program corresponding to the program list shown in Appendix Table III.
Figure 5B:
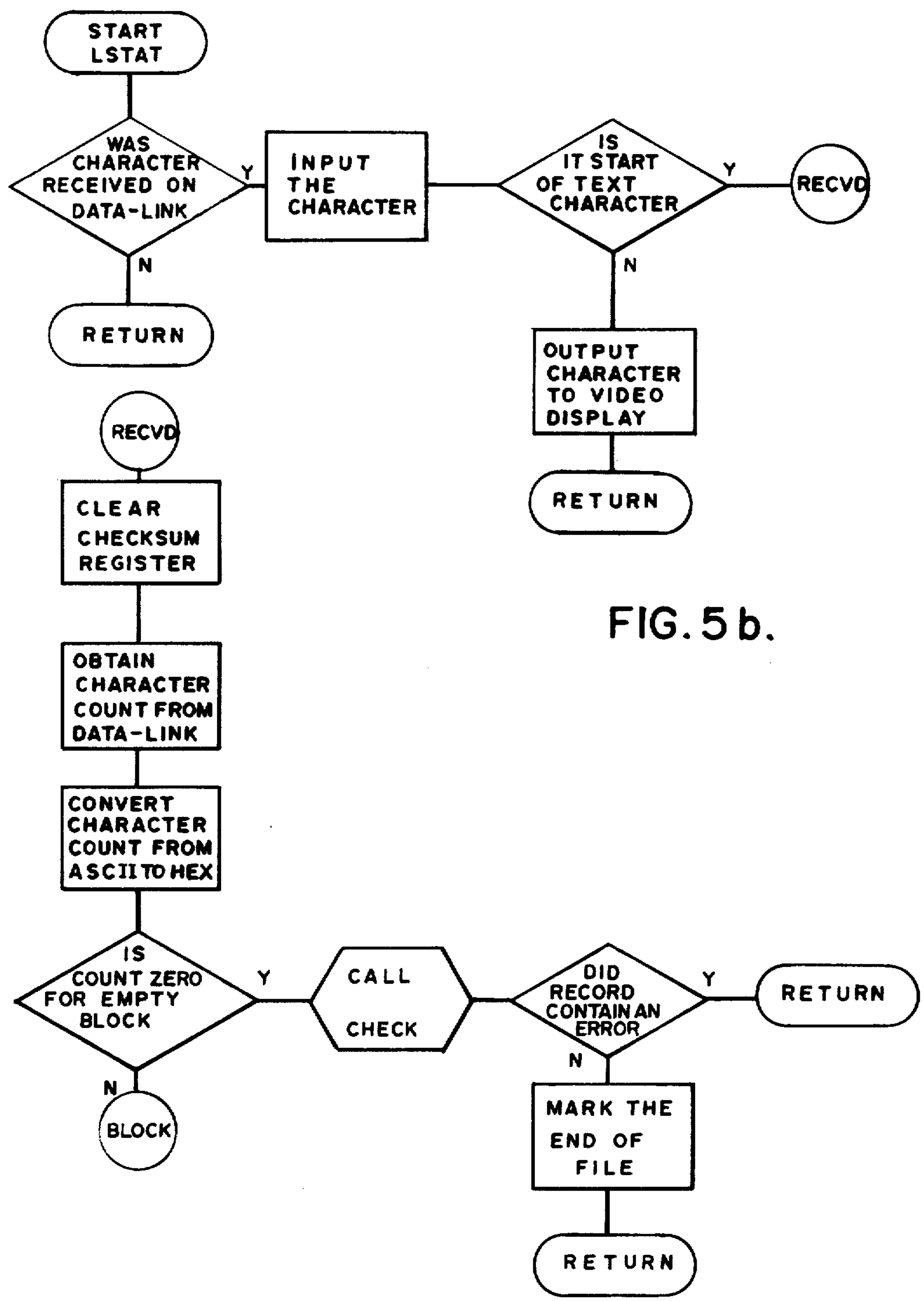
Figure 5C:
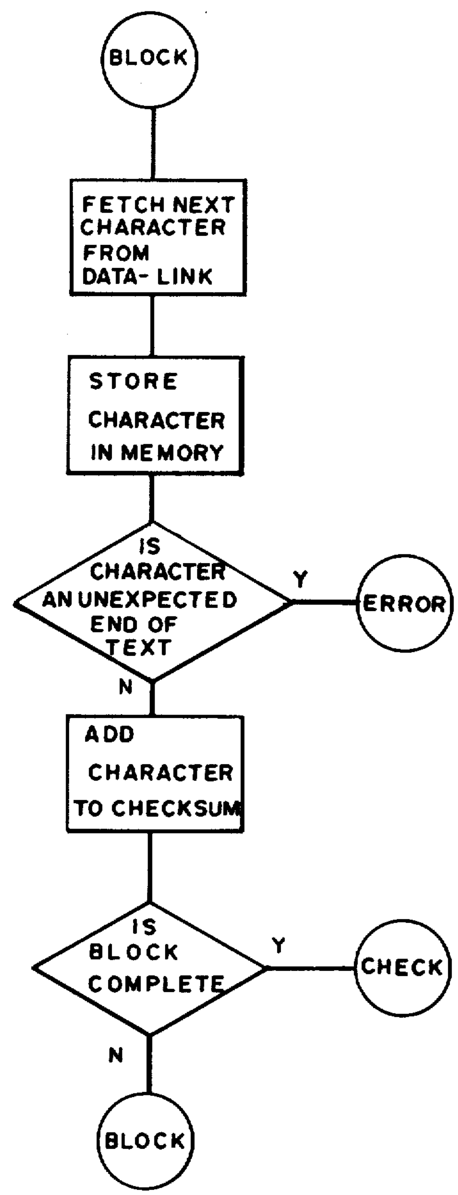
Figure 5D:
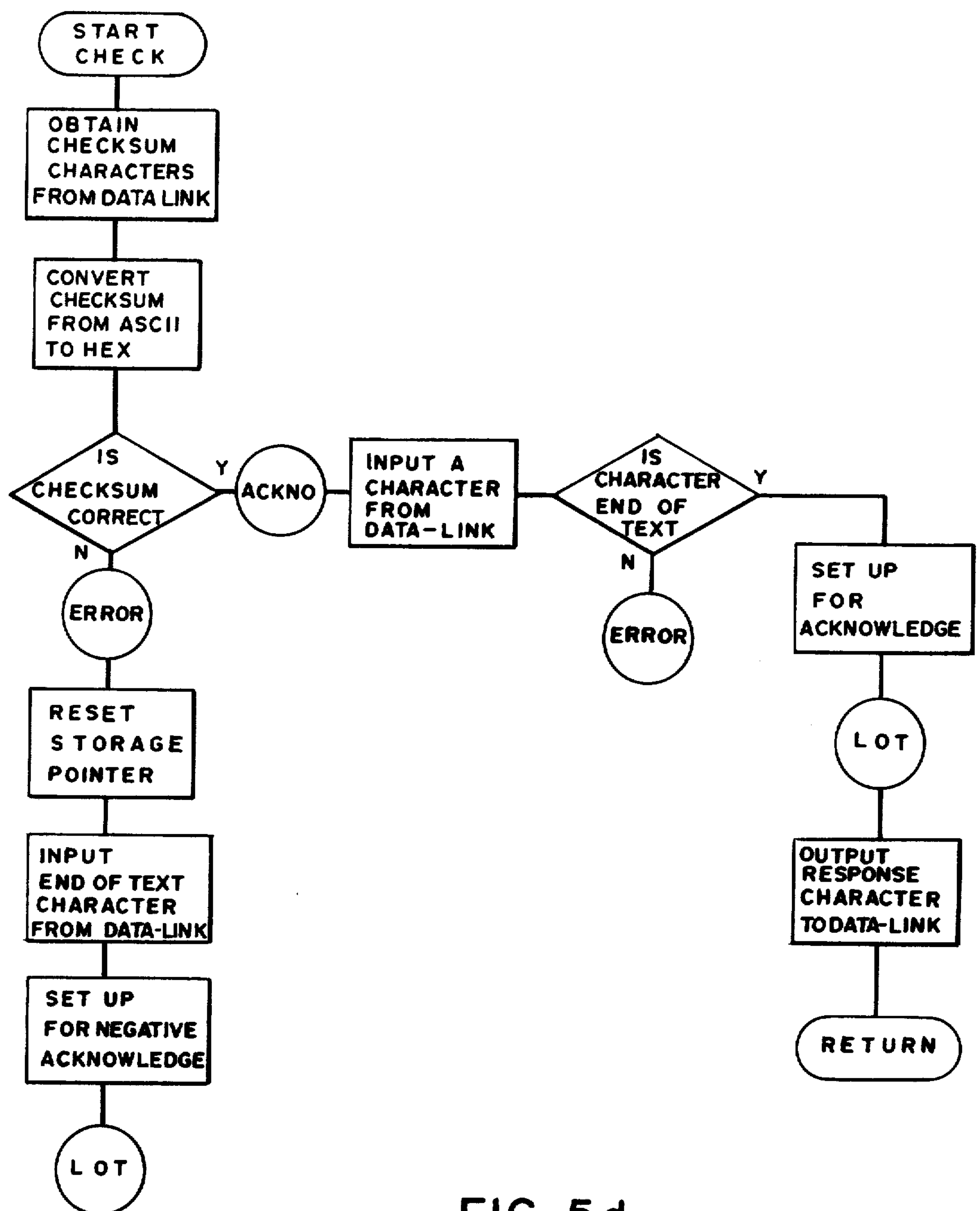
Figure 5E:
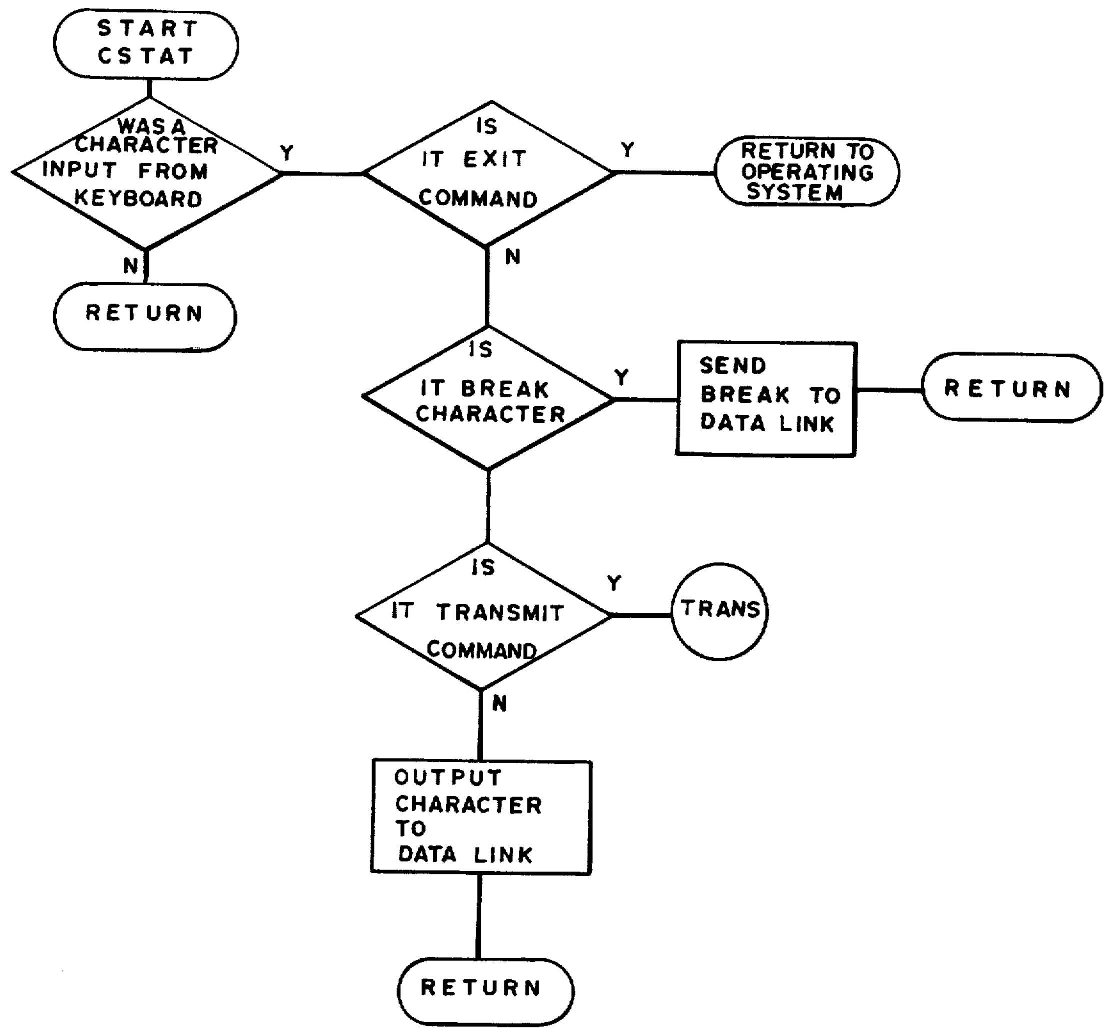
Figure 5F:
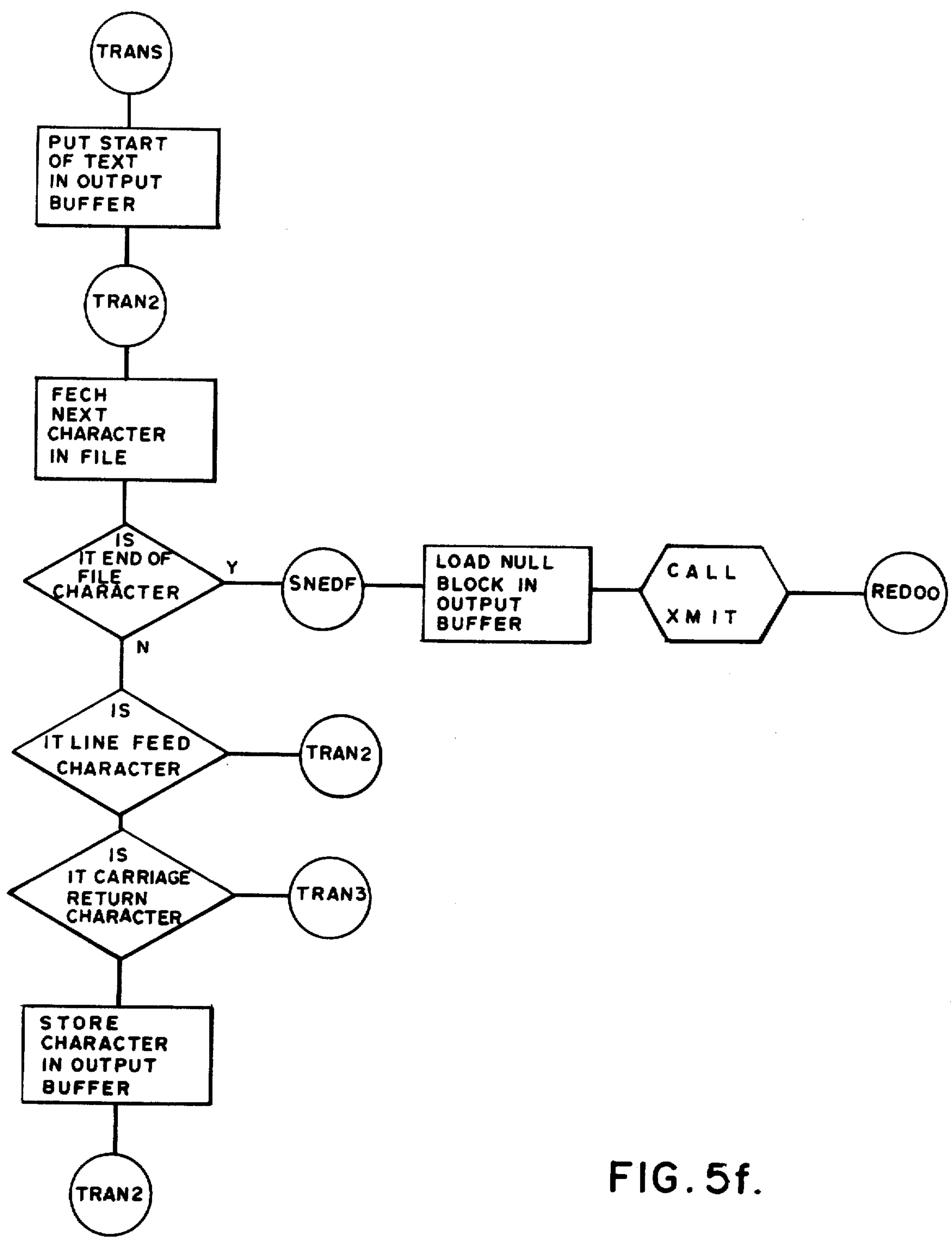
Figure 5G:
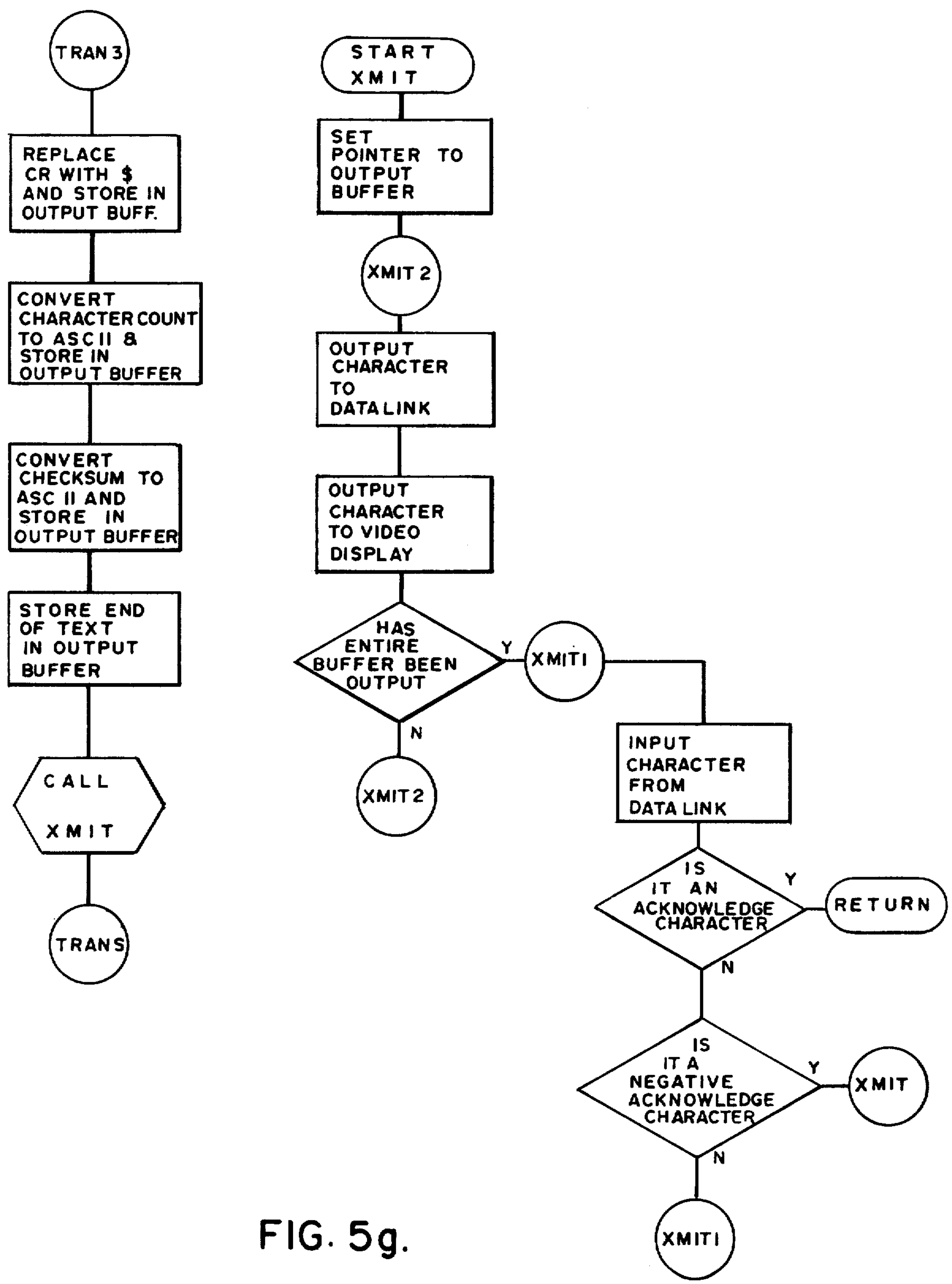

Microprocessor 3 can be used as a time sharing terminal with the host computer as in any other normal time share operating system. In addition, however, there are two procedures available which allows NC machine control data to be loaded to microprocessor 3 from the host computer and into the host computer from the microprocessor. To initiate communication between microprocessor 3 and host computer 13, the following procedure is used: The command M is entered, as heretofore described, and a number is dialed physically by the operator on the telephone. When a response in the video display occurs, the return (ret) is pressed or entered. A display generated by the host computer will appear on the CRT video display of terminal 7 and will request an entry for the time and date. A message LOG ON PLEASE will appear on this CRT display. This is a request for the operator to enter an account number for billing purposes to the host computer. On entry of the number, return (ret) is entered and the message PASSWORD appears on the CRT requesting entry of the appropriate password. Upon entry of the password, an identification number is assigned and appears on the CRT display following the letters ID and then the digits constituting the ID number. The host computer is then used in a normal manner with microprocessor 3 operating as a time sharing data terminal. If it is desired to fetch a part program from the memory or storage file of host computer 13 (i.e., to load a program from host computer into microprocessor 3), the fetch operation of the host computer is used to load post-processed punched output to microprocessor 3. This is the same output (PPU) which is used to produce a punched tape. In order to fetch a program, the current memory address in the microprocessor 3 is sent to the desired load address (i.e., the address point at which data is to begin loading). Then, the host computer fetch procedure is invoked and the name of the file is entered. Data transfer then takes place. To store a part program from the microprocessor to the host computer, the current memory address is set to the start of the program to be stored and the host computer store procedure is invoked in the file under which the program to be stored is entered. If an existing file namer is entered, the user has the option of replacing a conscious existing file or designating a different file in order to avoid duplication and errors. Table 1 (see Appendix) is a program listing of host computer's 13 fetch software which is utilized with the microprocessor 3 during the fetch operation. A block flow diagram of the host computer's receive or fetch program is shown in FIGS. 3*a*–3*c*. Table 2 (see Appendix) is a program listing of the store software of the host computer which is utilized during the store operation communication with microprocessor 3. A block flow diagram of the host computer's transmit or store program is shown in FIGS. 4*a*–4*e*. Table 3 (also see Appendix) is the microprocessor 3 communication program which inter-reacts with the host computer program in order to effect the store of operation. A block flow diagram of the microprocessor communications program is shown in FIGS. 5*a*–5*g*. The computer programs listed in Tables 1 and 2 are in Fortran computer programs. Table 3 is in assembly and machine code for an Intel model 8080 microprocessor.

Once data is loaded into microprocessor 3, communication between the host computer and the microprocessor may be disconnected and the NC machine tool MT may be operated as will hereinafter be explained. The run/load switch on terminal 7 is set to run the data, the buffer switch is set to its buffer position which engages microprocessor 3, and the EIA/ASCII switch is set to the code required by the particular NC machine tool MT. The current memory address is set to the start of the desired program using either the A or the P command. The actual start address is known, A may be entered followed by the starting address and return. The letter P may be entered with the positional designation and the current memory address will be set to the start of the selected program. If it is desired to begin at some point within the program, the current memory address may be set by entering S followed by the address of the beginning of the data block and a return. The entry of the serial in return will now cause NC machine tool MT to be run as if it were getting data from a tape reader. The control tape or program, which in reality is BCD STOR, is stored in memory 5 is automatically rewound when its end is reached (i.e., the address pointer will simply be reset to the beginning of the program). While data is being sent to machine tool MT, no entries may be made on the keyboard of terminal 7. When the job is complete, a master reset switch may be depressed to re-enable the keyboard. The commands heretofore described may also be used to edit machine data when it resides in microprocessor 3. To edit such a program, the desired program is selected, as heretofore indicated, a search is made for the area of the program to be changed, and the changes are made in accordance with the particular commands available for the system. Care must be taken, however, that there is sufficient space at the end of the program to accommodate any insertions to the program. If there is insufficient space, the end of the program being edited will write over the start of the next program thereby destroying the subsequent part program and interfering with its execution. Particular characters which are located at the specific memory addresses may likewise be deleted or changed by delete and eposite commands, as heretofore described. Since delete and deposit does not lengthen the program, there will be no effect on the data located at the start of the next program. Of course, if a part program loaded into microprocessor 3 has a serious error in it, microprocessor 3 may be operated as a time share communication device together with host computer 13. Thus, the higher level language in the host computer may be used to recompile the program and to retransmit it to the microprocessor. This, of course, cannot take place while the microprocessor is executing a part program. Microprocessor 3 is referred to as a dedicated computer in the sense that it is intended to be used and is designed to be used permanently with various kinds of NC machine tools. It should be recognized, however, that microprocessor 3 is indeed a computer system and may be utilized as a data management tool of various kinds upon suitable programming. In fact, upon determination of machine tool and upon the completion of the part being manufactured, the operator often returns to host computer 13 and enters management control data and other job information which may be utilized for accounting purposes, or even as a check on available inventory.

Operation of the computer driven machine tool control system 1 of the present invention will now be disclosed. First, a control program or control data is either generated or called from the memory of host computer 13. If a new control program is to be generated, this program is preferably prepared with the aid of the APT or equivalent language software in host computer 13. This new program may be generated either from terminal 7 located at the machine tool site or from another remote terminal (e.g., a remote terminal may be located in the programmer's office) with the additional remote terminal being also connected to the host computer. The program is transmitted via telephone line 17 to modem 15 for entry and storage in memory 5.

Microprocessor 3 operates as a buffer so that machine tool information can be fed directly as an update conversion of the NC machine tool. However, the microprocessor can be deactivated so that the MCU can be controlled by a punched paper tape fed into the MCU in the conventional manner by its tape reader. This has the advantage that if the microprocessor should happen to fail, the machine tool could continue to operate in the conventional manner under the control of a proven punched paper control tape.

Control system 1 of the present invention is capable of running machine tool MT and communicating with host computer 13 simultaneously, or it can run the machine tool without being connected to the host computer. In this last-mentioned mode of operation, control system 1 serves as a stand-alone system. With control system 1 in its stand-alone mode (i.e., with host computer 13 off-line), input, output and control of the system is through terminal 7. With the host computer on-line, the tool operator can make modifications to the control data stored in memory 5 in real time (i.e., within a few minutes). Thus, in a program tryout cycle, the object of the part program in memory 5 can be corrected on host computer 13 from terminal 7 at the site of the machine tool and the corrected program data can be returned to microprocessor 3 and storage 5 from the host computer in a matter of only a few minutes. This precludes multiple setups and teardowns of the machine tool which are now normally required to prove a new tape. Because fewer data tryout cycles are needed to prove a new control data and because repeated tooling changes or machine tool setups are not required due to the quick turnaround of the corrected data, the system of this invention has the effect of dramatically increasing the productivity of available prior art machine tools. Thus, NC machine tools may be used for longer periods of actual production and may be rapidly and efficiently changed over to produce different parts with only a minimal time required for program checkout. Since the number of program tryouts is effectively reduced when a control system of this invention is utilized, the productivity of part programming staff is also correspondingly increased.

As heretofore noted, microprocessor 3 and memory 5 communicate with MCU 9 in a tapeless mode via behind tape reader interface 11. By providing a tapeless input to the MCU, many problems associated with paper tape and the tape reader are eliminated. Also, because the control data can be corrected in real time from the shop floor, a significant savings in time and cost have been experienced. Unlike computer numerical control (CNC) systems, corrections to the control data and engineering changes are regularly incorporated by system 1 of the present invention on the master control data (or source deck) in the host computer without having to perform a separate updating operation.

Control system 1 of this invention allows parts to be quickly fabricated and permits engineering changes to be readily incorporated in the control data program. The resulting NC machining system is not only inexpensive (as compared to DNC systems), but the system of this invention has a "fast react" capability. This fast react capability enables machine shops utilizing the control system of this invention to readily change from producing one part to another.

In a full production shop having a number of NC machine tools, each of these NC machine tools would, of course, be controlled by its own respective computer driven control system 1 of the present invention with each of these control systems being linked to time sharing host computer 13 via a dial-up telephone line. Also, each control system 1 of this invention could be linked to any other control system 1 via a suitable dial-up telephone line data set (not shown). One of the advantages of such a control system is that in the event of an intermediate computer failure (i.e., failure of a microprocessor 3), only the machine tool directly controlled by the malfunctioning microprocessor would be down and all of the other machine tools would not be affected. However, even if the microprocessor of one machine tool control system is out of service, the control system 1 may be taken off-line from its machine tool and a proven punched paper control tape may be inserted in the MCU and read into the MCU via the its tape reader TR in the conventional manner. Also, if host computer 13 is unservicable, control system 1 of the present invention may operate as a stand-alone system independently of the host computer system for extended periods of time. Thus, production of parts from the machine tools controlled by the control systems of the present invention are not adversely affected by the failure of either the microprocessor 3 in the respective control systems or by the failure of the host computer 13.

In such multi-machine tool systems utilizing control systems 1, post processing operations can be done within host computer 13 utilizing its higher language capabilities. Alternative post processing could be done with microprocessor 3 so that host computer 13 is not required. Thus, a proven control program for a first machine tool could be post processed on the shop floor utilizing microprocessor 3 of control system 1 so as to separate the part-oriented data of the control data (i.e., the information pertaining to tool location) from the control information (i.e., information as to specific speed rates, spindle speeds, directions, coolant status, tool selection, etc.) for the first machine tool. The part information could then be transmitted via a telephone data set (not shown) to another control system 1 for a second NC machine tool and the control information for the second machine tool could be readily combined with the part information within the microprocessor of the second control system thereby to readily generate a control program for the second machine tool. This may all be accomplished without the use of host computer 13. This capability would enhance scheduling of various machine tools within a plant or in a scattered manufacturing complex, or even between remote plants, and would be available so long as there is a telephone line data hook up between the various control systems 1 of the present invention. Such a system would also give rise to a "fast react" manufacturing facility utilizing numerical control.

The method of this invention for controlling a NC machine tool contemplates the use of a computer driven control system 1 as heretofore described. More particularly, the method of the present invention involves generating a control program in a remotely located, time sharing general purpose host computer 13. This program is generated in computer 13 either by loading a new program source deck into the host computer or by calling up a program from disk storage. This selected program is then transmitted to microprocessor 3 in a control system 1 of the present invention at the site of the machine tool on the shop floor by means of a telecommunications link including modem 15 and telephone line 17. The program is transmitted to the microprocessor and is stored in storage memory 5. MCU 9 is then programmed (i.e., fed command signals) from memory 5 via the behind the tape reader interface 11 so that the MCU runs in a tapeless mode. The control program may be selectively modified or corrected (i.e., it may not need to be corrected at all, depending on the program) by means of input/output terminal 7 which is operated by the tool operator at the site of the tool on the shop floor. Upon correcting or modifying a control program, the corrections are automatically made to the master control tape (or source deck) in the host computer. A corrected control program is then transmitted from the host computer to memory 5 via the telephone hookup within a matter of minutes so that the data corrections are made essentially in real time. As heretofore mentioned, this real time data correction capability gives the control system of this invention the ability to rapdily correct the control program. This in turn significantly reduces the time required for a program tryout cycle. In practice the time required to correct the data is only a matter of minutes. Thus, there is no need to change the tooling of machine tool MT between successive program tryout cycles. The rapid capability of the method of this invention for checking out (i.e., proving) a new control program significantly improves the productivity of the machine tool.

EXAMPLE

The computer driven control system 1 of this invention has been tested on a NC punch press. Heretofore, approximately 325 different control tapes were used on the NC punch press every year. Under the prior art control system previously used with the NC punch press, an average of 2.4 tape tryout cycles were required to prove each new control tape. Also, an average of 6 tool changes were required for each new control tape with an average setup time of 0.1 hours for each tool change. In other words, approximately 1.44 hours were required for each setup of the punch press to perform a tape tryout cycle. Thus, approximately 460 hours of machine time were required each year for setup of the punch press for tape tryout cycles.

Since the computer driven control system 1 of this invention permits a control program to be corrected and reprocessed in real time, only one tooling setup of the punch press is usually required to prove a new control program. Hence, a direct savings of 250 hours per year in setup time was realized. This results in an additional 250 hours of production time for the punch press of the machine each year and correspondingly increases its productivity.

Further, the loading and unloading of the punched paper control tapes on the punch press tape reader, waiting for the tape to rewind, and waiting for broken or torn tapes to be replaced was eliminated. It was found that on the average, 8 control tapes were used on each shift in the making of production parts. This translates into over 6,000 tapes a year that were handled by the machine tool operator. It was found that it required about 3 minutes to load and unload the tape. This translates into 300 hours per year that are spent just in manually handling prior art paper tapes. Since the computer driven control system 1 of the present invention operates in a tapeless mode, a 300 hour per year savings in machine time is realized. Moreover, since malfunctions of the electromechanical tape reader are bypassed, additional savings of machine time can be realized.

In the operation of the above-described NC punch press, the prior procedure was to keep up a backup or master punched paper tape for each production tape used on the press. With about 325 production tapes per year being generated, with an average of 2 tapes being required to complete a tape tryout cycle, and with an additional tape required for the master file, approximately 1,000 punched paper tapes were required each year just to support this one NC punch press. The generation and maintenance of these tapes was found to require 2–3 man hours per day, or approximately 700 man-hours per year. This estimation does not include the time to hand carry the tapes between the tape library and the machine tool location. With the control system 1 of this invention, the problems associated with handling of various control tapes was significantly reduced.

In view of the above, it will be seen that the several objects and features of this invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

APPENDIX
TABLE I
HOST COMPUTER
FETCH LISTING

```
$FIXED
$BCD
                PROGRAM RCVCRC(INPUT,OUTPUT=/200,TAPE1,TAPE2=OUTPUT
           1,TAPE3=OUTPUT,TAPE4=INPUT,TAPE108)
                  INTEGER HEXBIN,ASCII,ASC20,ASC38
C          PROGRAM TO RECEIVE DATA FROM A REMOTE TERMINAL IN BLOCKED ASYNCHRONOUS
C********* I/O FORMAT WITH CHECKSUM AND RE-TRANSMISSION CAPABILITIES.
                 DIMENSION ASCII(64),IRECV(60)
                DIMENSION IPARSE(300)
                  DIMENSION IASC(64),ASC20(18),ASC38(27)
                  EQUIVALENCE (ASCII(1),IASC(1)),(ASCII(20),ASC20(1)),
           1    (ASCII(38),ASC38(1))
C*********        DATA PATTERN TO SET UP PERIPHERAL PROCESSOR TO READ 256 CHAR
                  DATA ISPPR/00060377000300000000B/
                  DATA IXON/4041B/
                DATA IACK,INAK,ISTX,IETX/4006B,4025B,4202B,4003B/
          DATA ( ASCII(I),I=1,19)/
          X     4000B,
          A     4101B,
          B     4102B,
          C     4303B,
          D     4104B,
          E     4305B,
          F     4306B,
          G     4107B,
          H     4110B,
          I     4311B,
          J     4312B,
          K     4113B,
          L     4314B,
          M     4115B,
          N     4116B,
          O     4317B,
          P     4120B,
          Q     4321B,
          R     4322B/
                DATA ASC20/
          S     4123B,
          T     4324B,
          U     4125B,
          V     4126B,
          W     4327B,
          X     4330B,
          Y     4131B,
          Z     4132B,
          0     4060B,
          1     4261B,
          2     4262B,
          3     4063B,
          4     4264B,
          5     4065B,
```

```
      6     40000B,
      7     42678,
      8     42708,
      9     40718/
            DATA ASC38/
      +     40538,
      -     40558,
      *     43778,
      /     42578,
      (     40118,
      )     42408,
C************ NOTE THIS VALUE IS NOT SAME AS IN TRANSMIT PROGRAM
      $     40448,
      =     42458,
      X     42408,
      ,     42548,
      .     40568,
      X   6*40008,
C************** NOTE THIS VALUE IS NOT SAME AS IN TRANSMIT PROGRAM
      $     42158,
      X   9*40008/
            DATA ASCII(56)/40128/,ASCII(059)/40748/,ASCII(60)/42768/
              DATA JACK,JNAK/0007400600000000000B,0007422500000000000B/
C********     FUNCTION TO SHIFT AND OR ONE WORD WITH ANOTHER
              IROR(IN,IPAT)=ISHIFT(IN,12).OR.IPAT
C
  90    CALL SAMLIN(15,'PROGRAM SAVE ID')
 100    FORMAT(' FILE NAME')
 120    READ(2/110)FILE
 110          FORMAT(A8)
            IF(FILE.EQ.'END     ')STOP '... DONE WITH DATA TRANSFERS '
          CALL OPEN(1,FILE,150S,1)
C********     IF FILE EXISTS, LET USER SPECIFY IF HE WANTS IT ERASED
              WRITE(2,105)FILE
 105        FORMAT(1XA8,'ALREADY EXISTS, DOU YOU WANT TO OVERWRITE')
              READ(2/110)ANS
              IF(ANS.NE.'YES     ')GO TO 90
C********     DELETE OLD FILE AND GET READY TO RE-WRITE.
              CALL CLOSE(1,1)
C********     RE-OPEN AS A NEW FILE UNDER SAME NAME
 150        CALL OPEN (1,FILE,0,2)
C********     SEND X ON TO ADAPTER, PUT PERIPHERAL PROCESSOR IN
C********     IN BINARY READ MODE AND RETURN CONTROL WHEN AN ETX
C********     IS RECEIVED OR WHEN 256 CHARACTERS ARE RECEIVED
              JSEND=00074007422100000008
              WRITE(3)JSEND,ISPPR
C******** THIS READ WILL USUALLY TERMINATE WITH AN ERROR CODE
C******** NUBER 89 SINCE THE NUMBER OF CHARACTERS WILL BE LESS THAN 300.
C
  400         READ(4,ERR=410)IRECV
 410        CALL ERCODE(I)
            IF(I.NE.89)STOP 89
              CALL CRC(IRECV,IPARSE)
C********     TAKE PARSED DATA AND START VALIDATION PASS
C********    CONVERT CHARACTER COUNT TO DECIMAL FROM HEX
             NCHR=HEXBIN(IPARSE(3))*16+HEXBIN(IPARSE(4))
C********    CHECK FOR ERROR IN CHARACTER COUNT ... PASSED FROM "HEXBIN"
```

```
                IF(NCHR.LT.0)GO TO 500
                NLOOP=NCHR+7
C               WRITE(2,1205)(IPARSE(KK),KK=1,NLOOP)
 200    FORMAT(72R1)
C********       CHECK DATA STREAM FORMAT TO MAKE SURE IT IS
C********       BOUNDED BY AN "ETX"
                ISUM=0
                IF(IPARSE(NCHR+7).NE.4003B)GO TO 500
C********       COME HERE IF, DATA IS BOUNDED BY ETX AND CHECK THE CHECKSUM CHARACTERS
                NLOOP=NCHR+4
                DO 450 J=3,NLOOP
 450            ISUM=ISUM+IPARSE(J)
                ISUM=ISUM+HEXBIN(IPARSE(NCHR+5))*16+HEXBIN(IPARSE(NCHR+6))
                ISUM=ISUM.AND.377B
                IF(ISUM.NE.0)GOTO 500
C
C********       DATA IS O.K. SO GO AHEAD AND WRITE IT ON DISK
                CALL WDISK(IPARSE,IASC,NCHR)
C********       CHECK FOR INVALID CHARACTER CODES RECEIVED IN WDISK
                IF(NCHR.LT.0)GO TO 500
                WRITE(3)JACK,ISPPR
                IF(NCHR.NE.0)GO TO 400
                CALL CLOSE(1,0)
                WRITE(2,475)NRETRY
 475            FORMAT(' NUMBER OF ERRORS DETECTED AND CORRECTED=',I5)
                STOP 'DATA TRANSFER SUCCESFULLY COMPLETED'
 500            WRITE(3)JNAK,ISPPR
C********       UPDATE RETRY COUNTER
                NRETRY=NRETRY+1
                GO TO 400
 1205           FORMAT(/,4(1XO4))
            END
C********     FUNCTION TO CONVERT AN ASCII CHARACTER IN HEX FORMAT
C********     TO A 4 BIT BINARY NIBBLE
              INTEGER FUNCTION HEXBIN(I)
              INTEGER HEX(16)
              DATA HEX/4060B,4261B,4262B,4063B,4264B,4065B,4066B,
      1       4267B,4270B,4071B,4101B,4102B,4303B,4104B,4305B,
      2       4306B/
C
              DO 100 J=1,16
              IF(HEX(J).EQ.I)GOTO 200
 100          CONTINUE
C********     ... ILLEGAL CHARACTER , NOT IN HEX FORMAT ... RETURN A NEGATIVE NUMBER, INDICATING AN ERROR
               HEXBIN=-9999
               RETURN
 200          HEXBIN=J-1
              RETURN
              END
C
C
C********     SUBROUTINE  TO UNPACK A BINARY DATA STREAM
C
              SUBROUTINE CRC(IRECV,IPARSE)
              INTEGER IRECV(60),IPARSE(300)
C********     PARSE RECEIVED DATA
              K=0
```

```
          DO 100 J=1,60
          DO 110 I=1,5
110       IPARSE(K+6-I)=ISHIFT(IRECV(J),-12*(I-1)).AND.7777B
100       K=K+5
          RETURN
          END
C******** SUBROUTINE TO WRITE DATA ONTO A DISK FILE
          SUBROUTINE WDISK(IPARSE,IASC,NCHR)
C
C******** IPARSE=ARRAY WITH ONE BINARY CHARACTER PER WORD
C******** IASC  =ARRAY WITH TRANLATION FROM BINARY TO DISPLAY CODE
C******** NCHR=NUMBER OF CHARACTER
C******** IEND=END OF FILE INDICATOR (0=END OF FILE)

C
          DIMENSION IPARSE(300),IASC(64),IBUF(72)
          DATA N/0/
          IF(NCHR.EQ.0)GO TO 500
          NLOOP=NCHR+4
C******** CONVER TO 6 BIT CODE AND LOAD INTO IBUFF
          DO 200 J=5,NLOOP
          DO 210 I=1,64
          IF(IPARSE(J).EQ.IASC(I))GO TO 215
210       CONTINUE
C************************************************************************
C          INVALID CHARACTER CODE WAS RECEIVED
C          RETURN AN ERROR INDICATION BY MAKING NCHR NEGATIVE
C************************************************************************
           NCHR=-9999
           RETURN
C
C
C
215       N=N+1
          IBUF(N)=I-1
          IF(N.LT.72)GOTO 200
C******** WRITE ONTO DISK
          N=0
          WRITE(1/300)IBUF
300       FORMAT(72R1)
200       CONTINUE
          RETURN
C******** IF END OF FILE INDICATOR IS RECEIVED, WIRTE OUT REST OF
C******** IBUF AND RETURN
500       WRITE(1/300)(IBUF(I),I=1,N)
          N=0
          RETURN
          END
```

APPENDIX
TABLE II
HOST COMPUTER
STORE LISTING

```
$FIXED
$BCD
           PROGRAM CRC(INPUT,OUTPUT=/550,TAPE1,TAPE2=OUTPUT
      1,TAPE3=OUTPUT,TAPE4=INPUT,TAPE108)
             INTEGER A,ASCII,ASC20,ASC38
C******    PROGRAM TO TRANSMIT DATA TO A REMOTE TERMINAL IN BLOCKED ASYNCHRONOUS
C******    I/O FORMAT WITH CHECKSUM AND RE-TRANSMISSION CAPABILITIES.
C******           WRITTEN BY RAVI K. BHOLA                                 MCAUTO
C******             REVISED BY W. G. ABKEMEIER
C******    VERSION OF 4/11/78
C*****     VERSION FOR EMERSON ELECTRIC
C*****     LOM SAVED IN BEXMT
C
            DIMENSION A(120),ASCII(64),ISEND(55)
            DIMENSION IPATCH(18)
              DIMENSION IASC(64),ASC20(18),ASC38(27)
              EQUIVALENCE (ASCII(1),IASC(1)),(ASCII(20),ASC20(1)),
      1    (ASCII(38),ASC38(1))
           EQUIVALENCE (KK,KKEQ)
         DATA IPATCH/16B,44B,44B,42B,15B,33B,33B,53B,
      1                  16B,44B,44B,43B,53B,
      2                  16B,44B,44B,44B,53B/
           DATA IACK,INAK,ISTX,IETX/4006B,4225B,4202B,4003B/
        DATA ( ASCII(I),I=1,19)/
      X    4000B,
      A    4101B,
      B    4102B,
      C    4303B,
      D    4104B,
      E    4305B,
      F    4306B,
      G    4107B,
      H    4110B,
      I    4311B,
      J    4312B,
      K    4113B,
      L    4314B,
      M    4115B,
      N    4116B,
      O    4317B,
      P    4120B,
      Q    4321B,
      R    4322B/
           DATA ASC20/
      S    4123B,
      T    4324B,
      U    4125B,
      V    4126B,
      W    4327B,
      X    4330B,
      Y    4131B,
```

```
         Z     41328,
         0     40608,
         1     42618,
         2     42628,
         3     40638,
         4     42648,
         5     40658,
         6     40668,
         7     42678,
         8     42708,
         9     40718/
               DATA ASC38/
         +     40538,
         -     40558,
         *     43778,
         /     42578,
         (     40118,
         )     42408,
         $     42158,
         =     42458,
         X     40008,
         ,     42548,
         .     40568,
         X   6*40008,
         $     40128,
         X   9*40008/
               DATA ASCII(46)/42408/
               DATA ASCII(56)/40128/,ASCII(059)/4074B/,ASCII(60)/4276B/
                 DATA IREAD/0006000100000000000008/
         DATA ICHCNT/0/,IBFLMT/255/
C
C******  START OF PROGRAM
C
C*****  OBTAIN PROGRAM ID
 90    CALL SAMLIN(10,'PROGRAM ID')
 120     READ(2/110)FILE
           IRSTP = 2
 110           FORMAT(A8)
             IF(FILE.EQ.'END      ')STOP 2000
       CALL OPEN(1,FILE,1000S,1)
C******
C******  START OF DATA HANDLING LOOP
C******  THIS LOOP IS TRAVERSED UNTIL EOF IS FOUND
C
C******  CLEAR EOF,M30,COMMENT,SPECIAL CHARACTER FLAGS
        IEOF = 0
        M30FLG = 0
        ICMFLG = 0
        ISPCHR = 0
C******  LOOP START - ENDS AT 5001
 5000 CONTINUE
C******  INITIALIZE CHECKSUM AND BUFFER CHARACTER COUNT
        ICHKSM = 0
        IBFCNT = 0
C******  SET BUFFER START POINTERS
        IW = 1
        ICHAR = 4
```

```
C******
C******  START OF BUFFER FILLING LOOP
C******  THIS LOOP IS TRAVERSED UNTIL BUFFER IS FULL OR EOF IS FOUND
C        END OF LOOP IS AT 4001
C
  4000 CONTINUE
C******  IF SPECIAL CHARACTER FLAG IS SET,SIMPLY LOAD THAT CHARACTER
C        AND BYPASS NORMAL CHARACTER FETCH
       IF(ISPCHR.NE.0) 4010,4090
C*****    FLAG IS SET, IS IT >?
  4010    IF (ISPCHR.EQ.2) 4020,4030
  4020      JCHAR = 53B
            ISPCHR = 0
            ICMFLG = 0
  4030    CONTINUE
C*****    IS FLAG SET FOR CR?
          IF(ISPCHR.EQ.1) 4040,4080
  4040        CONTINUE
C*****      IS THIS A COMMENT? YES - SET FOR > NEXT
            IF(ICMFLG.EQ.1) 4050,4060
  4050          ISPCHR = 2
              JCHAR = 67B
              GO TO 4070
  4060        ISPCHR = 0
          GO TO 4090
  4070      CONTINUE
  4080    GO TO 4430
C*****    NO SPECIAL CHARACTERS
C         SEE IF ADDITIONAL CHARACTERS IN THIS RECORD
  4090    ICHCNT = ICHCNT + 1
          IF(ICHCNT.GT.ICHLMT) 4100,4160
C*****      READ NEXT RECORD FROM FILE
  4100      READ(1/200,END=4110)(A(I),I=1,72)
   200      FORMAT(72R1)
            GO TU 4120
C*****        END OF FILE,SET FLAG AND EXIT FROM BUFFER LOOP
  4110        IEOF = -1
              GO TO 5002
C*****        HAVE NEW RECORD,RESET CHARACTER COUNT
  4120        ICHCNT = 1
C*****        STRIP TRAILING BLANKS AND )
              DO 2000 J=1,72
                 IF(A(73-J).NE.55B.AND.A(73-J).NE.52B)GO TO 2110
  2000        CONTINUE
              GO TO 4100
  2110        K = 73 - J
              IF(K.LT.1)GO TO 4100
C*****        ADD CR IF REQUIRED FOR POSTPR AND PARTNO RECORDS
              ENCODE(10,133,KEY)(A(I),I=1,6)
   133        FORMAT(6R1,'    ')
              IF(KEY.EQ.'POSTPR    ') GO TO 4100
              IF(KEY.EQ.'PARTNO    ') GO TO 4130
              GO TU 4140
  4130        ICMFLG = -1
              DO 6002 I=1,K
              IF(A(I).EQ.53B) GO TO 4140
  6002        CONTINUE
```

```
              K =K + 1
              A(K) = 53B
 4140         CONTINUE
C*****        STRIP LEADING BLANKS AND )
              KK=-1
              DO 6200 I=1,K
              KK=KK+1
              IF(A(I).NE.52B.AND.A(I).NE.55B) GO TO 6210
 6200         CONTINUE
 6210         IF (KK.EQ.0) GO TO 6230
              K = K - KK
              DO 6220 I =1,K
              A(I) = A(KK+I)
 6220         CONTINUE
 6230         CONTINUE
C*****        SET CHARACTER LIMIT
              ICHLMT = K
 4150       CONTINUE
 4160     CONTINUE
C*****    FETCH NEXT CHARACTER
          JCHAR = A(ICHCNT)
C*****    CHECK IF CR ($), IF YES-SET FLAG FOR LINE FEED
          IF(JCHAR.EQ.53B.AND.ICMFLG.NE.0) 6240,6250
 6240       ISPCHR = 1
            JCHAR = 73B
 6250     CONTINUE
C*****    CLEAR M30 FLAG IF NECESSARY
          IF(M30FLG.EQ.3) M30FLG = 0
C*****    CHECK IF COMMENT,LOAD < IF START OF LINE
C         ELSE LOOK FOR M30 AND DELETE IT IF FOUND
          IF(ICMFLG.NE.0) 4210,4240
 4210       IF(ICMFLG.EQ.-1) 4220,4230
 4220         JCHAR = 72B
              ICHCNT = ICHCNT - 1
              ICMFLG = 1
 4230       GO TO 4420
C*****      CHECK FOR M30 AND DELETE IT IF FOUND
 4240       IF(JCHAR.EQ.15B) 4250,4260
 4250         M30FLG = 1
              GO TO 4410
C*****        M PREVIOUSLY FOUND?, LOOK FOR 3
 4260         IF(M30FLG.EQ.1) 4270,4310
 4270           IF(JCHAR.EQ.36B) 4280,4290
 4280             M30FLG = 2
                  GO TO 4300
 4290             JCHAR = 15B
                  ICHCNT = ICHCNT - 1
                  M30FLG = 0
 4300           GO TO 4400
C*****          M3 PREVIOUSLY FOUND?,LOOK FOR 0
 4310           IF(M30FLG.EQ.2) 4320,4360
 4320             IF(JCHAR.EQ.33B) 4330,4340
 4330               M30FLG = 3
                    GO TO 4350
 4340               JCHAR = 15B
                    ICHCNT = ICHCNT - 1
                    M30FLG = -1
```

```
      4350      GO TU 4390
     C*****     SEE IF 3 IS TO BE OUTPUT
      4360      IF(M30FLG.EQ.-1) 4370,4380
      4370        JCHAR = 36B
                  ICHCNT = ICHCNT - 1
                  M30FLG = 0
      4380      CONTINUE
      4390     CONTINUE
      4400    CONTINUE
      4410   CONTINUE
      4420  CONTINUE
      4430 CONTINUE
     C***** SKIP OUTPUT IF THIS CHAR IS PART OF M30
           IF(M30FLG.GT.0) GO TO 4470
     C*****     CONVERT CHAR TO ASCII,ADD TO CHECKSUM,STORE IN OUTPUT BUFFER
                IASCHR = ASCII(JCHAR+1)
                ICHKSM =ICHKSM + IASCHR
                ISEND(IW) = ISHIFT(ISEND(IW),12).OR.IASCHR
                ICHAR = ICHAR + 1
                IF(ICHAR.LT.5) GO TO 1200
     C****      IF 5 CHAR ALREADY PACKED INTO WORK,THEN INDEX WORD POINTER AND
     C*****     RESET # OF CHAR PACKED INTO WORD COUNTER
                ICHAR = 0
                IW = IW + 1
      1200      CONTINUE
     C*****     SEE IF BUFFER HAS BEEN FILLED
                IBFCNT = IBFCNT + 1
                IF(IBFCNT.EQ.IBFLMT) GO TO 5002
      4470 CONTINUE
      4001 GO TO 4000
      5002 CONTINUE
     C******       BUILD HEADER BLOCK WITH STX,CHARACTER COUNT AND BIT PATTERN TO SET KRONOS
     C******       TTY HANDLER IN BINARY OUTPUT MODE
     C******       DATA BLOCKS LOOK LIKE: STX/CHAR COUNT/DATA/CHECKSUM/ETX
     C
     C******       CONVERT CHARACTER COUNT TO 2 HEX DIGITS
                   K = IBFCNT
                   KMSN=K/16
                   KLSN=MOD(K,16)
                   JHEADR=ISHIFT(7,12).OR.ISTX
                   IF(KMSN.GT.9)KMSN=ASCII(KMSN-8)
                   IF(KMSN.LE.9)KMSN=ASCII(KMSN+28)
                   IF(KLSN.GT.9)KLSN=ASCII(KLSN-8)
                   IF(KLSN.LE.9)KLSN=ASCII(KLSN+28)
                   JHEADR=ISHIFT(JHEADR,12).OR.KMSN
                   JHEADR=ISHIFT(JHEADR,12).OR.KLSN
                   ICHKSM=ICHKSM+KMSN+KLSN
                   ISEND(1) = ISHIFT(JHEADR,12).OR.ISEND(1)
     C******      CONVERT CHECKSUM TO HEX (TAKE NEGATIVE FIRST)
     C******      ALSO BUILD TRAILER CHARACTER (ETX)
                  ICHKSM=-ICHKSM+1
                  ICHKSM=ICHKSM.AND.377B
      1225        JTRAIL=0
                  KMSN=ICHKSM/16
                  KLSN=MOD(ICHKSM,16)
                  IF(KMSN.GT.9)KMSN=ASCII(KMSN-8)
                  IF(KMSN.LE.9)KMSN=ASCII(KMSN+28)
```

```
               IF(KLSN.GT.9)KLSN=ASCII(KLSN-8)
               IF(KLSN.LE.9)KLSN=ASCII(KLSN+28)
C******        PACK CHECKSUM INTO TRANSMIT ARRAY
               IE=1
      1205     IF(ICHAR.LT.5)GOTO 1207
               IW=IW+1
               ICHAR=0
      1207     GOTO(1230,1240,1250,1500,1500,1500)IE
      1230     ISH=KMSN
               GO TO 1290
      1240     ISH=KLSN
               GO TO 1290
      1250     ISH=IETX
      1290     IE=IE+1
               ISEND(IW)=ISHIFT(ISEND(IW),12).OR.ISH
               ICHAR=ICHAR+1
               GO TO 1205
C******        FILL REST OF LAST WORD WITH NULLS AFTER
C******        NOTE:NULLS IMBEDDED WITHIN STX AND ETX
C******        WILL BE STORED AS ZERO'S
      1500     J=5-ICHAR
C******        TAKE CARE OF END EFFECTS ... FILL OUT LAST WORD TO BE
C******        TRANSMITTED WITH NULLS.
               IF(J.LE.0)GOTO 1504
               IF(J.NE.5)GO TO 2100
               IW=IW-1
               GO TO 1504
      2100     DO 2200  I=1,J
      2200     ISEND(IW)=ISHIFT(ISEND(IW),12).OR.0000B
      1504     CONTINUE
C******        WRITE(2,1295)(ISEND(IWW),IWW=1,IW)
      1505     WRITE(3)(ISEND(I),I=1,IW)
      1506     WRITE(3)IREAD
C******READ ACKNOWLEDGEMENT FROM TERMINAL AND RE-TRANSMIT
C******IF AN "ACK" IS NOT RECEIVED
          READ(4)IRES
          IRES=ISHIFT(IRES,-36).AND.7777B
               IF(IRES.EQ.IACK)GO TO 1190
               IF (IRES.NE.INAK) GO TO 1506
               NRETRY=NRETRY+1
               GO TO 1505
      1190     DO 1210 J=1,IW
      1210     ISEND(J)=0
               JHEADR=0
      1295     FORMAT(/,3(1X020))
             IF(IEOF.EQ.0) GO TO 5000
      5001   CONTINUE
             GO TO 300
      1000   CALL CLOSE (1)
             GO TO 90
      310      FORMAT(/,' NUMBER OF ERRORS DETECTED AND CORRECTED :'I4)
C******        SEND AN END OF FILE RECORD (CHARACTER COUNT=0)
C******        STX/00/A0/ETX
      300      JEOF=0007420240604060401 01B
               JJEOF=4060400300060001 4000B
      320      WRITE(3)JEOF,JJEOF
               READ(4)IRES
```

```
IRES=ISHIFT(IRES,-36).AND.7777B
IF(IRES.EQ.IACK)GOTO 330
    NRETRY=NRETRY+1
    GO TO 320
330 WRITE(2,310)NRETRY
END
```

APPENDIX
TABLE III
MICROPROCESSOR
COMMUNICATIONS PROGRAM
FOR INTEL 8080

```
                                ;DWIGHT INSTRUMENT COMPANY -- TIMES
                                ;MCAUTO --- 10/27/77 -- REV 1.7 --
                                ;EDWARD J. GERRI
                                ;
                                ;
                                ;
                                ;LINK TO SPBOS VERSION 4.1REV.D
                                ;
                                ;
                                ;
                                ;GLOBAL CONSTANTS -- I/O -- LITERAL
                                ;
                                ;
0009 =          LINKS   EQU     09          ;LINK STATUS PORT
0008 =          LINKD   EQU     08          ;LINK DATA PORT
0001 =          CONST   EQU     01          ;CONSOLE STATUS POR
0000 =          CONSD   EQU     00          ;CONSOLE DATA PORT
F800 =          SAVEA   EQU     0F800H      ;ADDRESS POINTER AR
F802 =          SAVET   EQU     0F802H      ;TEMPORARY STORAGE
F610 =          TRBLK   EQU     0F610H      ;TRANSMIT BLOCK BUF
FD00 =          OPERS   EQU     0FD00H      ;MAIN OPERATING SYS
000B =          LINKB   EQU     0BH         ;DATA LINK SPEED
0002 =          STX     EQU     02H         ;START OF TEXT CHAR
0006 =          ACK     EQU     06H         ;ACKNO CODE
007F =          EOR     EQU     7FH         ;END OF RECORD
0011 =          XON     EQU     11H         ;READER ON CODR
0093 =          XOFF    EQU     93H         ;READER OFF CODR
0095 =          NAK     EQU     95H         ;NEGATIVE ACKNO COD
```

```
0003 =             ETX       EQU     03H       ;END OF TEXT CHARAC
007F =             PMASK     EQU     07FH      ;PARITY MASK
0000 =             NULL      EQU     00H       ;DELAY CHARACTER
001A =             EXIT      EQU     1AH       ;EXIT COMMAND CHARA
0014 =             XMIT      EQU     14H       ;TRANSMIT COMMAND +
                             ;
                             ;
                             ;
F900                         ORG     0F900H    ;TEMPORARY PROGRAM
                             ;
                             ;
                             ;
                   START:
F900 3E60                    MVI     A,60H     ;DATA LINK SPEED
F902 D33B                    OUT     LINKB     ;SET SPEED
F904 DB38                    IN      LINKD     ;CLEAR DATA LINK
                   REDOR:
F906 CD30F9                  CALL    CSTAT     ;SEE IF A KEYBOARD
F909 CD0FF9                  CALL    LSTAT     ;SEE IF A LINK ENTR
F90C C306F9                  JMP     REDOR
                   LSTAT:
F90F DB39                    IN      LINKS     ;LINK STATUS PORT
F911 E610                    ANI     10H       ;LINK DATA READY
F913 C8                      RZ                ;NO INTERRUPT
                   LIN:
F914 DB38                    IN      LINKD     ;IF READY GET THE D
F916 4F                      MOV     C,A       ;SETUP FOR OUTPUT
F917 FE00                    CPI     NULL      ;IGNORE LINE DELAYS
F919 C8                      RZ
F91A FE02                    CPI     STX       ;SEE IF START OF TE
F91C CA5FF9                  JZ      RECVD     ;GET SET TO STORE D
                   COT:
F91F DB31                    IN      CONST     ;SEE IF CONSOLE REA
F921 E620                    ANI     20H       ;BUFFER REGISTER EM
F923 CA1FF9                  JZ      COT
F926 79                      MOV     A,C       ;GET THE DATA
F927 B7                      ORA     A         ;SET THE FLAGS
F928 EA2DF9                  JPE     COT0      ;PARITY OK
F92B F680                    ORI     80H       ;ADD PARITY BIT
                   COT0:
F92D D330                    OUT     CONSD     ;SEND DATA TO CONSO
F92F C9                      RET
```

```
                        CSTAT:
F930 D801                      IN      CONST      ;KEYBOARD INTERRUPT
F932 E610                      ANI     10H        ;CONSOLE DATA READY
F934 C8                        RZ
                        CIN:
F935 DB10                      IN      CONSD      ;GET THE DATA
F937 E67F                      ANI     PMASK      ;MASK OFF PARITY
F939 FE1A                      CPI     EXIT       ;SEE IF EXIT COMMAN
F93B CAFAF9                    JZ      FINIS
F93E FE03                      CPI     03         ;SEE IF BREAK KEY H
F940 CAF2FA                    JZ      BREAK
F943 FE14                      CPI     XMI1       ;SEE IF TRANSMIT CO
F945 CA11FA                    JZ      TRANS
F948 4F                        MOV     C,A        ;SAVE CHARACTER FOT
                        LOT:
F949 DB09                      IN      LINKS      ;SEE IF LINK READY
F94B E620                      ANI     20H        ;TRANSMIT REGISTER
F94D CA49F9                    JZ      LOT        ;GO WAIT
F950 79                        MOV     A,C        ;GET THE DATA
F951 B7                        ORA     A          ;SET THE FLAGS
F952 EAF7F9                    JPE     LOT0       ;PARITY OK
F955 F680                      ORI     80H        ;ADD PARITY BIT
                        LOT0:
F957 D308                      OUT     LINKD      ;SENT DATA
F959 C9                        RET
                        FINIS:
F95A 3333                      INX     SPIINX  SP       ;RESET STAC
F95C C3?0FD                    JMP     OPERS      ;BRANCH TO OPERATIN
                        RECVD:
F95F 0600160?                  MVI     B,0IMVI D,0
F963 2A30F822022?              LHLD    SAVEAISHLD       SAVET
F969 CD27FA                    CALL    LINE1      ;GET  CHARACTER
F96C 82                        ADD     D          ;ADD TO CHECKSUM
F96D 57                        MOV     D,A        ;STORE IN CHECKSUM
F96E E67F                      ANI     PMASK      ;MASK PARITY
F970 CDF2F9                    CALL    NIBBL      ;CONVERT ASCII TO H
F973 07070707                  RLCIRLCIRLCIRLC    ;JUSTIFY CHARACTER
F977 E6F0                      ANI     0F0H       ;MASK OFF LOWER NIB
F979 47                        MOV     B,A        ;TEMP STORE CHARACT
F97A CD27FA                    CALL    LINE1      ;GET A CHARACTER
F97D F5                        PUSH    PSW        ;SAVE A COPY
F97E 8257                      ADD     DIMOV   D,A
```

```
F980 F1                    POP     PSW       ;RETRIEVE DATA
F981 E67F                  ANI     PMASK     ;MASK PARITY
F983 CDF2F9                CALL    NIBBL     ;CONVERT ASCII TO H
F986 E60F                  ANI     0FH       ;MASK UPPER NIBBL
F988 B347                  ORA     BIMOV     5,A
F98A C29BF9                JNZ     BLOCK     ;NOT A 00 RECORD
F98D CD55F9                CALL    CHECK     ;CHECKSUM DATA
F990 FE95                  CPI     NAK
F992 C8                    RZ                ;IF ZERO GO DO AGAI
F993 2B                    DCX     H         ;DECREMENT POINTER
F994 367F                  MVI     M,EOR
F996 23                    INX     H         ;UPDATE POINTER
F997 2203F8                SHLD    SAVEA     ;SAVE NEW START
F99A C9                    RET
                           ;B NOW CONTAINS RECORD COUNT
                   BLOCK:
F99B CDFDF9                CALL    LINE      ;GET A CHARACTER
F99E 77                    MOV     M,A       ;STORE CHARACTER
F99F FE03                  CPI     ETX       ;PREMATURE ETX?
F9A1 CAF4F9                JZ      ERROR     ;EXIT IF PREME.
F9A4 8257                  ADC     CIMOV     D,A
F9A6 7E                    MOV     A,M       ;RETRIEVE DATA
F9A7 E67F                  ANI     PMASK     ;MASK OFF PARITY
F9A9 77                    MOV     M,A       ;RESTORE DATA
F9AA 05                    DCR     B         ;COUNT DOWN
F9AB CA55F9                JZ      CHECK     ;GET CHECKSUM
F9AE 23                    INX     H         ;INCREMENT POINTER
F9AF 2203F8                SHLD    SAVEA     ;UPDATE POINTER
F9B2 C39BF9                JMP     BLOCK     ;DO AGAIN
                   CHECK:
F9B5 CD07FA                CALL    LINE1     ;GET CHARACTER
F9B8 E67F                  ANI     PMASK     ;MASK PARITY
F9BA CDF2F9                CALL    NIBBL     ;CONVERT TO HEX
F9BD 07070707              RLCIRLCIRLCIRLC
F9C1 E6F0                  ANI     0F0H      ;MASK LOWER NIBBL
F9C3 47                    MOV     B,A       ;TEMPORARY STORE
F9C4 CD07FA                CALL    LINE1     ;GET NEXT
F9C7 E67F                  ANI     PMASK
F9C9 CDF2F9                CALL    NIBBL     ;CONVERT TO HEX
F9CC E60F                  ANI     0FH       ;MASK UPPER NIBBL
F9CE B0                    ORA     B         ;A=CHECKSUM + C=TOT
```

```
F9CF 82                      ADC   : C          ;IS ZERO RESULT
F9D0 C2E4F9                  JNZ     ERROR
                  ACKNO:
F9D3 CDFDF9                  CALL    LINE       ;GET A CHARACTER
F9D6 FE03                    CPI     ETX        ;END OF RECORD?
F9D8 C2E4F9                  JNZ     ERROR      ;WHAT HAPPENED
F9DB 0E06                    MVI     C,ACK      ;ACKNO CHARACTER
F9DD 23                      INX   : H          ;ADVANCE POINTER
F9DE 2200F8                  SHLD    SAVEA      ;SAVE A COPY
F9E1 C349F9                  JMP     LOT        ;SEND ACK
                  ERROR:
F9E4 2A02F82200              LHLD    SAVETISHLD.     SAVEA
F9EA CDFDF9                  CALL    LINE       ;GET AN ETX CHARACT
F9ED 0E95                    MVI     C,NAK      ;NEGATIVE ACKNO CHA
F9EF C349F9                  JMP     LOT        ;SEND NAK
                  NIBBL:
F9F2 C6BF                    ADI     0BFH       ;JUSTIFIER
F9F4 F2FAF9                  JP      NIBB1
F9F7 C607                    ADI     7          ;SEE IF A/N
F9F9 D8                      RC
                  NIBB1:
F9FA C60A                    ADI     10         ;JUSTIFY NUMBER
F9FC C9                      RET
                  LINE:
F9FD DB09                    IN      LINKS      ;GET STATUS
F9FF E610                    ANI     10H
FA01 CAFDF9                  JZ      LINE       ;GO WAIT
FA04 C314F9                  JMP     LIN        ;GO DO IT
                  LINE1:
FA07 DB09                    IN      LINKS      ;GET STATUS
FA09 E610                    ANI     10H
FA0B CA07FA                  JZ      LINE1
FA0E DB08                    IN      LINKD      ;GET THE CHARCTER
FA10 C9                      RET
                  TRANS:
FA11 2A00F82202              LHLD    SAVEAISHLD     SAVET
FA17 010300                  LXI     B,0        ;SET BC=0
FA1A 1100F8                  LXI     D,TRBLK    ;TRANSMIT BLOCK ARE
FA1D 3E02                    MVI     A,STX
FA1F 12                      STAX  : D
FA20 1313                    INX   : DIINX : D
```

```
                            TRAN1:
FA22 13                             INX     D          ;POINT TO NEXT
                            TRAN2:
FA23 7E                             MOV     A,M        ;GET CHARACTER
FA24 23                             INX     H
FA25 220AF8                         SHLD    SAVEA      ;UPDATE POINTER
FA28 FE7F                           CPI     FOR        ;END OF FILE
FA2A CA99FA                         JZ      SNEOF
FA2D FE0A                           CPI     0AH        ;LINE FEED?
FA2F CA23FA                         JZ      TRAN2      ;IGNORE
FA32 FE0D                           CPI     0DH        ;CARRIGE RETURN
FA34 CA41FA                         JZ      TRAN3
FA37 CD0DFA                         CALL    PARIT      ;ADD PARITY
FA3A 12                             STAX    D          ;STORE CHAR IN BLK
FA3B 04                             INR     B          ;UPDATE COUNT
FA3C 814F                           ADC     CIMOV  ;  C,A
FA3E C322FA                         JMP     TRAN1
                            TRAN3:
FA41 3E24                           MVI     A,'$'      ;CR=$
FA43 12                             STAX    D          ;STORE CHAR
FA44 04                             INR     B
FA45 814F                           ADC     CIMOV  ;  C,A
FA47 13C5                           INX     CIPUSH :  D
                            CONV1:
FA49 1111F8                         LXI     D,TRBLK+1
FA4C 78                             MOV     A,B        ;GET COUNT
FA4D CDE4FA                         CALL    HEASC      ;GO CONVERT
FA50 1111F8                         LXI     D,TRBLK+1
FA53 1A                             LDAX    D          ;GET CHAR
FA54 CD0DFA                         CALL    PARIT
FA57 12                             STAX    D          ;UPDATE MEMORY CHAR
FA58 814F                           ADC     CIMOV  :  C,A
FA5A 131A                           INX     CILDAX :  D
FA5C CD0DFA                         CALL    PARIT
FA5F 12                             STAX    D          ;UPDATE MEMORY CHAR
FA60 814F                           ADC     CIMOV  :  C,A
FA62 D1                             POP     D          ;GET END OF TRBLK
FA63 79                             MOV     A,C        ;GET CHECKSUM
FA64 2F                             CMA                ;COMPLEMENT FOR 2+
FA65 3C                             INR     A          ;2'S COMPLEMENT
FA66 CDE4FA                         CALL    HEASC      ;CONVERT
```

```
FA69 3E03                MVI    A,ETX      ;END OF TEXT
FA6B 12                  STAX   D
FA6C CD72FA              CALL   XMIT       ;GO SEND BLOCK
FA6F C311FA              JMP    TRANS
                 XMIT:
FA72 2110F8              LXI    H,TRBLK
FA75 CD02FA              CALL   PDOF1      ;GO SEE IF READY
                 XMIT2:
FA78 CDC0FA              CALL   PDOFF      ;HOST READY
FA7B 4E                  MOV    C,M        ;GET A CHAR
FA7C CD49F9              CALL   LOT        ;SEND
FA7F CD1FF9              CALL   COT        ;ECHO TO CRT
FA82 FE03                CPI    ETX        ;DONE
FA84 CA8BFA              JZ     XMIT1
FA87 23                  INX    H
FA88 C378FA              JMP    XMIT2
                 XMIT1:
FA8B CD27FA              CALL   LINE1
FA8E FE06                CPI    ACK
FA90 C8                  RZ
FA91 FE15                CPI    NAK        ;SEE IF TRUE NAK
FA93 CA72FA              JZ     XMIT       ;TRANSMIT AGAIN
FA96 C38BFA              JMP    XMIT1
                 SNEOF:
FA99 2110F8              LXI    H,TRBLK ;BLOCK START
FA9C 360223              MVI    M,STX!INX  H
FA9F 363023              MVI    M,'0'!INX  H
FAA2 363023              MVI    M,'0'!INX  H
FAA5 364123              MVI    M,'A'!INX  H
FAA8 363023              MVI    M,'0'!INX  H
FAAB 360323              MVI    M,ETX!INX  H
FAAE CD72FA              CALL   XMIT
FAB1 C306F9              JMP    REDC0
                 HEASC:
FAB4 F5                  PUSH   PSW        ;SAVE A COPY
FAB5 0F0F0F0F            RRC!RRC!RRC!RRC
FAB9 E60F                ANI    0FH        ;MASK UPPER NIBBLE
FABB CDC4FA              CALL   HEXDS
FABE F1                  POP    PSW        ;RETRIEVE ORIGINAL
FABF E60F                ANI    0FH        ;MASK UPPER
FAC1 C3C4FA              JMP    HEXDS
```

```
                 HEXDS:
FAC4 C690               ADI     90H       ;A-F CAUSE CARRY
FAC6 27                 DAA
FAC7 CE40               ACI     40H       ;ADD IN CARRY
FAC9 27                 DAA
FACA 12                 STAX    D         ;STORE CHARACTER
FACB 13                 INX     D
FACC C9                 RET
                 RDOFF:
FACD DB39               IN      LINKS     ;GET STATUS OF LINK
FACF E610               ANI     12H
FAD1 C8                 RZ                ;RETURN IF READY
                 RDOF1:
FAD2 DB38               IN      LINKD     ;GET DATA
FAD4 FE11               CPI     XON       ;READY?
FAD6 C8                 RZ
FAD7 FE93               CPI     XOFF      ;NOT READY?
FAD9 CAD2FA             JZ      RDOF1
FADC C9                 RET
                 PARIT:
FADD B7                 ORA     A         ;SET THE FLAGS
FADE E8                 RPE               ;RETURN IF OK
FADF F680               ORI     80H       ;SET PARITY BIT ON
FAE1 C9                 RET
FEA1 =           INLOP  EQU     0FEA1H    ;SFBOS DELAY ROUTIN
                 BREAK:
FAE2 3EF7               MVI     A,0F7H    ;BREAK ON
FAE4 D309               OUT     LINKS     ;SEND BREAK
FAE6 110000             LXI     D,0       ;SET COUNT TO 530MS
FAE9 CDA1FE             CALL    INLOP     ;DELAY ROUTINE
FAEC 3EFF               MVI     A,0FFH    ;BREAK OFF
FAEE D339               OUT     LINKS     ;SEND IT
FAF0 C9                 RET
```

I claim:

1. In a numerically controlled machine tool including a machine control unit for controlling operation of the numerically controlled machine tool, a general purpose computer for providing operating commands to said machine control unit, said general purpose computer including means for generating a control program, the improvement which comprises a control system interposed between said general purpose computer and said machine control unit, and means for linking said control system to said general purpose computer to enable said control system to access said computer on a time sharing basis to receive said control program for said machine tool, said control system including an individual computer dedicated to said numerically controlled machine tool, said dedicated computer being connected to said machine control unit and being linked to said general computer on a time sharing basis, a storage memory operatively connected to said dedicated computer, a peripheral input/output device connected to said dedicated computer and located proximate to the numerically controlled machine tool, said dedicated computer being interfaced with said machine control unit so as to provide an input directly to the machine control unit so that said dedicated computer functions as a control data buffer for said machine control unit, said input/output device enabling an operator to modify the control program held in the storage memory of said dedicated computer from a location proximate said machine tool and to update the control program in said general purpose computer on a time sharing basis.

2. The improvement of claim 1 wherein said dedicated computer is a microprocessor.

3. The improvement of claim 2 wherein said input/output device comprises a video display and key board terminal.

4. The improvement of claim 2 wherein said microprocessor is connected to said machine control unit by a behind-the-tape reader interface, said behind-the-tape reader interface permitting operation of said machine control unit from one of said microprocessor and a punched program tape.

5. The improvement of claim 4 further including a modulator/demodulator interposed between said microprocessor and said general purpose computer.

6. The improvement of claim 5 wherein the storage memory of said microprocessor is sized to permit storage of a plurality of control programs for said numerically controlled machine tool at the location of the machine tool.

7. A system for operating a numerically controlled machine tool, said numerically controlled machine tool including a machine control unit connected to and physically located with said machine tool for controlling operation thereof, said machine control unit having a program paper tape reader associated with it for operating said machine tool from a programmed paper tape, comprising:

- a general purpose computer located remotely from the site of said machine tool, said general purpose computer containing a control program for said machine tool;
- a dedicated microprocessor located proximate to said machine tool operatively connected to said general purpose computer for receiving said control program;
- a dedicated storage memory operatively connected to said dedicated microprocessor in which at least one of said control programs for said machine tool may be stored;
- an input/output peripheral device connected to said dedicated microprocessor for permitting correcting of the control program at said machine tool;
- a tape reader interface operatively connected between said microprocessor said machine control unit, said dedicated microprocessor being operatively connected to said machine control unit behind the tape reader so that said machine control unit may be operated by one of said microprocessor and a programmed paper tape; and
- means for operatively connecting said dedicated microprocessor to said general purpose computer on a time sharing basis to permit both reception of the control program from and correction of the control program in said general purpose computer from said input/output peripheral device.

8. The system of claim 7 wherein said input/output device is a video display/keyboard terminal.

9. A method of operating a numerically controlled machine tool, said numerically controlled machine tool including a machine control unit, comprising the steps:

- generating a control program for said machine tool on a remotely located, time sharing general purpose computer;
- transmitting the control program to a computer dedicated to the numerically controlled machine at the location of said machine tool;
- storing said control program in a storage memory operatively associated with said dedicated computer at the location of said machine tool;
- disassociating said dedicated computer from said time share general computer;
- operating said machine control unit from said dedicated computer;
- correcting said control program as required from an input/output terminal located proximate said machine tool;
- reassociating said dedicated computer with said general purpose computer to correct the control program maintained in said general purpose computer; and
- disassociating said dedicated computer from said general time sharing computer after said last-mentioned reassociating step.

10. The method of claim 9 wherein said machine control unit has a tape reader input including the further step of operating said numerically controlled machine tool from one of said dedicated computer and said tape reader input to said machine control unit.

11. The method of claim 10 further including the steps of storing a plurality of control programs in said storage memory and selecting the program from said storage memory to operate said machine control unit through said dedicated computer.

12. The method of claim 9 further comprising the steps of post processing the control program of said dedicated computer thereby to separate the part oriented data from the machine control oriented data, and constructing another control program for controlling another numerically controlled machine by utilizing said part oriented data and other machine tool control data for said other machine tool without post processing said data on said time sharing computer.

13. The improvement of claim 1 wherein the dedicated computer is adapted for post processing operations on said numerical control data including separation of part-oriented data from machine tool control data for a first machine tool, and generating numerical control data for a second machine tool by combining said part-oriented data and control data for said second machine tool independently of said general purpose computer.

14. The system of claim 7 wherein the dedicated microprocessor is adapted for post processing operations on said numerical control data including separation of part-oriented data from machine tool control data for a first machine tool, and generating numerical control data for a second machine tool by combining said part-oriented data and control data for said second machine tool independently of said general purpose computer.

15. A computer driven, numerically controlled system, comprising:

a machine tool responsive to numerical control data;

a machine control unit operatively connected to said machine control unit having an input operatively connected to a tape reader;

a tape reader connected to said machine control unit;

a general purpose computer having numerical control data stored in it;

a computer located at said machine tool, said machine tool computer being adapted for post processing operation on numerical control data including separation of part oriented data from machine tool control data for a first machine tool, and generating numerical control data for a record machine tool by combining said part oriented data and control data for said second machine tool independently of said general purpose computer;

data storage means accessible by said machine tool computer for storing numerical control data;

means for operatively connecting one of said tape reader and said machine tool computer to said machine control unit;

means for operatively connecting said machine tool computer to said general purpose computer on a time sharing basis; and an input/output device including a video display and keyboard terminal at said machine tool computer and operatively connected to said general purpose computer through said time sharing means and to said machine tool computer to provide access to said numerical control data at said general purpose computer and said data storage means at said machine tool computer.

* * * * *

UNITED STATES PATENT AND TRADEMARK OFFICE

CERTIFICATE OF CORRECTION

PATENT NO. : 4,281,379

DATED : July 28, 1981

INVENTOR(S) : Len S. Austin

It is certified that error appears in the above—identified patent and that said Letters Patent is hereby corrected as shown below:

Column 6, line 43, "commerically" should read -- commercially --.

Column 6, line 50, "couse" should read -- course --.

Column 9, line 35, "N0060Y:10" should resd -- N0060Y-10 --.

Column 11, line 22, "namer" should read -- name --.

Signed and Sealed this

*Twenty-seventh* Day of *April 1982*

[SEAL]

*Attest:*

GERALD J. MOSSINGHOFF

*Attesting Officer* *Commissioner of Patents and Trademarks*